US010750128B2

(12) United States Patent
Fu et al.

(10) Patent No.: US 10,750,128 B2
(45) Date of Patent: Aug. 18, 2020

(54) WIRELESS INTEGRATION OF SECURITY CAMERA AND DOOR LOCK

(71) Applicant: Kuna Systems Corporation, San Bruno, CA (US)

(72) Inventors: Sai-Wai Fu, Los Altos Hills, CA (US); Harold G. Sampson, Sunnyvale, CA (US); Haomiao Huang, Redwood City, CA (US)

(73) Assignee: KUNA SYSTEMS CORPORATION, San Bruno, CA (US)

( * ) Notice: Subject to any disclaimer, the term of this patent is extended or adjusted under 35 U.S.C. 154(b) by 0 days.

(21) Appl. No.: 16/280,377

(22) Filed: Feb. 20, 2019

(65) Prior Publication Data

US 2019/0327448 A1 Oct. 24, 2019

Related U.S. Application Data

(63) Continuation of application No. 16/143,853, filed on Sep. 27, 2018, now Pat. No. 10,389,983, which is a continuation of application No. 16/111,669, filed on Aug. 24, 2018, now Pat. No. 10,389,982.

(60) Provisional application No. 62/789,113, filed on Jan. 7, 2019, provisional application No. 62/661,341, filed on Apr. 23, 2018.

(51) Int. Cl.
*H04N 7/18* (2006.01)
*H04N 7/08* (2006.01)
*G08B 3/10* (2006.01)
*H04N 7/14* (2006.01)

(52) U.S. Cl.
CPC ............... *H04N 7/181* (2013.01); *G08B 3/10* (2013.01); *H04N 7/0806* (2013.01); *H04N 7/142* (2013.01)

(58) Field of Classification Search
None
See application file for complete search history.

(56) References Cited

U.S. PATENT DOCUMENTS

| 8,984,622 | B1 * | 3/2015 | Baldwin | G06F 21/32 |
| | | | | 726/16 |
| 2010/0131273 | A1 * | 5/2010 | Aley-Raz | G10L 17/24 |
| | | | | 704/247 |
| 2016/0182856 | A1 * | 6/2016 | Child | G06K 9/00221 |
| | | | | 348/14.16 |
| 2017/0278363 | A1 * | 9/2017 | Webb | H04L 12/2803 |

* cited by examiner

*Primary Examiner* — Christopher G Findley
(74) *Attorney, Agent, or Firm* — Christopher P. Maiorana, PC

(57) ABSTRACT

An apparatus includes an audio output device, an audio input device and a processor. The audio output device may be configured to generate an audio message. The audio input device may be configured to receive audio input. The processor may be configured to analyze the audio input to perform a first authentication of a user and determine a command corresponding to the audio input, determine a confidence level of a classification of a user based on the first authentication and authenticate the user if the confidence level is above a pre-determined threshold. The classification may correspond to an approved list of users. The confidence level may be adjusted in response to one or more authentication factors. If the user is authenticated, the processor may be configured to perform the command.

20 Claims, 12 Drawing Sheets

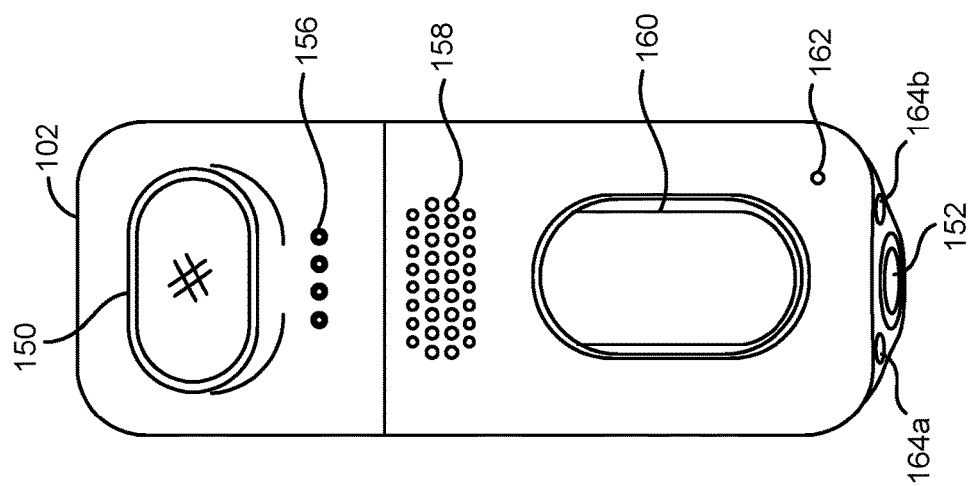
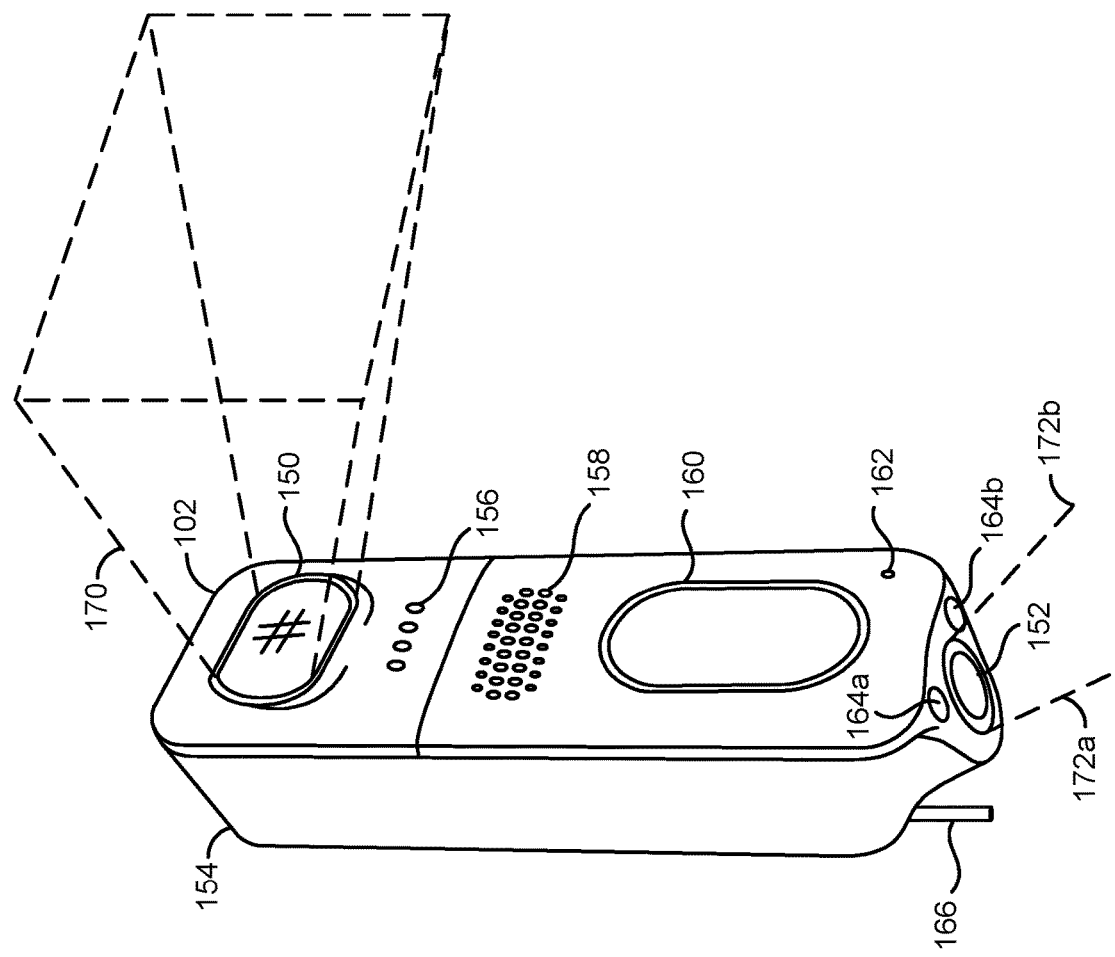

US 10,750,128 B2

WIRELESS INTEGRATION OF SECURITY CAMERA AND DOOR LOCK

This application relates to U.S. Provisional Application No. 62/789,113, filed Jan. 7, 2019, which relates to U.S. Ser. No. 16/143,853, filed Sep. 27, 2018, which relates to U.S. Ser. No. 16/111,669, filed Aug. 24, 2018, which relates to U.S. Provisional Application No. 62/661,341, filed Apr. 23, 2018 and U.S. Ser. No. 16/252,841, filed Jan. 21, 2019 which relates to U.S. Ser. No. 15/899,007, filed Feb. 19, 2018, now U.S. Pat. No. 10,212,778, which are all hereby incorporated by reference in their entirety.

FIELD OF THE INVENTION

The invention relates to security devices generally and, more particularly, to a method and/or apparatus for implementing wireless integration of security camera and door lock.

BACKGROUND

Internet-connected devices are increasing in popularity, particularly for home automation. However, services are segmented. Each internet-connected device provides a separate functionality, but can also include a separate interface/app, a separate user account, and separate security concerns. Many internet-connected devices have poor security or fail to patch security flaws.

Internet-connected devices can combine functionality by physically integrated components. Physically integrating multiple types of functionality on a single device increases costs, increases device complexity and increases the size of the device. Furthermore, physically integrating multiple components still results in many of the same shortcomings as single-function internet-connected devices.

It would be desirable to implement wireless integration of security camera and door lock.

SUMMARY

The invention concerns an apparatus comprising an audio output device, an audio input device and a processor. The audio output device may be configured to generate an audio message. The audio input device may be configured to receive audio input. The processor may be configured to analyze the audio input to perform a first authentication of a user and determine a command corresponding to the audio input, determine a confidence level of a classification of a user based on the first authentication and authenticate the user if the confidence level is above a pre-determined threshold. The classification may correspond to an approved list of users. The confidence level may be adjusted in response to one or more authentication factors. If the user is authenticated, the processor may be configured to perform the command.

BRIEF DESCRIPTION OF THE FIGURES

Embodiments of the invention will be apparent from the following detailed description and the appended claims and drawings.

FIG. 3 is a diagram illustrating an example embodiment of an outdoor hub.

FIG. 4 is a diagram illustrating an alternate view of the outdoor hub.

DETAILED DESCRIPTION OF THE EMBODIMENTS

Embodiments of the present invention include providing wireless integration of a security camera and door lock that may (i) authenticate users, (ii) implement artificial intelligence for authentication, (iii) control remote devices, (iv) respond to voice commands, (v) implement a wireless hub to communicate with remote devices, (vi) perform multiple authentication steps and/or (vii) be implemented as one or more integrated circuits.

Figure 1:
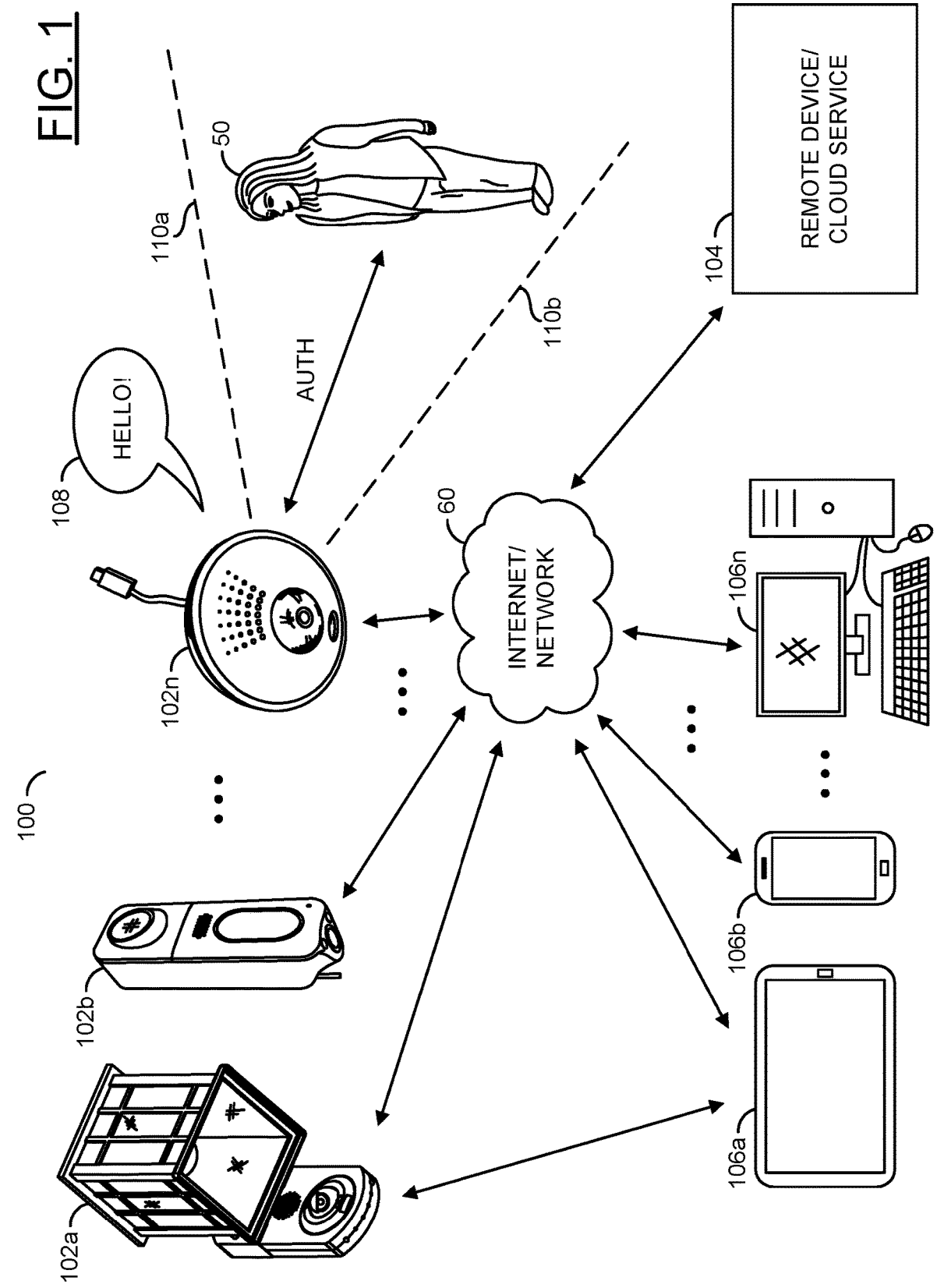
FIG. 1 is a diagram illustrating an example embodiment of the present invention.

Referring to FIG. 1, a diagram illustrating an example embodiment of the present invention is shown. A system 100 is shown. The system 100 may comprise a user 50, a network 60, a number of blocks (or circuits) 102a-102n, a block (or circuit) 104 and a number of blocks (or circuits) 106a-106n. The user 50 may be a visitor to a premises or a homeowner. The network 60 may be a local network and/or a wide area network (e.g., the internet). The circuits 102a-102n may implement devices. In one example, the devices may implement one or more sensors. In another example, each of the devices 102a-102n may implement a smart security camera. In yet another example, the devices 102a-102n may implement an outdoor hub for outdoor internet-of-things (IoT) devices (shown in association with FIG. 2). The circuit 104 may implement a remote device and/or cloud service. The circuits 106a-106n may implement user devices. The system 100 may comprise other components (not shown). The number, type and/or implementation of the components of the system 100 may be varied according to the design criteria of a particular implementation.

The devices 102a-102n may implement smart security devices. In the example shown, the device 102a may be a smart security light, the device 102b may be a smart security doorbell and the device 102n may be a smart security camera. The smart security devices 102a-102n may comprise various sensors. The devices 102a-102n may be configured to read sensor data from the sensors to make inferences about the environment. In one example, one of the sensors implemented by the devices 102a-102n may be a camera sensor.

Camera sensors implemented by the devices 102a-102n may be configured to capture video data. The devices 102a-102n may be configured to perform video analysis (e.g., object detection, behavior detection, facial recognition, object classification, etc.). For example, each of the devices 102a-102n may implement on-board artificial intelligence configured to interpret the video data, determine characteristics of objects in the video data and communicate the data in a format that may be stored and/or read by the remote device 104.

The devices 102a-102n may implement a wireless module. The wireless module may enable the devices 102a-102n to communicate wirelessly (e.g., using Wi-Fi, ZigBee, Bluetooth, LTE, etc.) via the internet 60 and/or a local connection. In the example shown, the device 102a may communicate directly with the user device 106a (e.g., a device-to-device connection, such as Bluetooth). The wireless communication capability may enable the devices 102a-102n to operate as a hub for a variety of network-connected devices. For example, the network-connected devices may communicate directly with the devices 102a-102n on a local network and the devices 102a-102n may communicate information from the network-connected devices to the remote device 104 via the interne 60.

The devices 102a-102n may be configured to communicate the sensor data and/or the inferences made in response to performing sensor fusion operations on the sensor data to the remote device 104 and/or the user devices 106a-106n via the network 60. The devices 102a-102n may operate independently of the network 60 (e.g., without instructions from the remote device 104 and/or the user devices 106a-106n). Communication with the remote device 104 and/or the user devices 106a-106n may enhance the capabilities of the devices 102a-102n. In one example, the processing capabilities of the remote device 104 may enable faster and/or more detailed video analysis of the video data and/or audio data captured by the devices 102a-102n.

The remote device 104 may be configured to provide processing and/or mass storage for the system 100. Generally, the remote device 104 may be located off-site from the devices 102a-102n. The remote device 104 may be configured to store data, retrieve and transmit stored data, process data and/or communicate with other devices. The remote device 104 may be implemented as part of a cloud computing platform (e.g., distributed computing). In an example, the remote device 104 may be implemented as a group of cloud-based, scalable server computers. By implementing a number of scalable servers, additional resources (e.g., power, processing capability, memory, etc.) may be available to process and/or store variable amounts of data. For example, the remote device 104 may be configured to scale (e.g., provision resources) based on demand. The remote device 104 may implement scalable computing (e.g., cloud computing). The scalable computing may be available as a service to allow access to processing and/or storage resources without having to build infrastructure (e.g., the provider of the system 100 may not have to build the infrastructure of the remote device 104). In the example shown, the remote device 104 is shown as a single block. However, the remote device 104 may be implemented as several computing devices (e.g., servers) located in many different locations.

The user devices 106a-106n may enable a user to send and/or receive information to/from the devices 102a-102n. The user devices 106a-106n may provide a graphical user interface to enable a homeowner to interact with the devices 102a-102n (e.g., an app). In an example, the graphical user interface of the user devices 106a-106n may be used to adjust the settings of the various sensors implemented by the devices 102a-102n.

The user devices 106a-106n may be configured to communicate with the remote device 104. For example, the user devices 106a-106n may be configured to retrieve video data and/or audio data stored by the remote device 104. The user devices 106a-106n may be configured to receive notifications from the devices 102a-102n and/or the remote device 104. In one example, the notification may be a message that indicates that the sensors of the devices 102a-102n have detected an object (e.g., a person).

The user devices 106a-106n may be implemented as portable devices configured to display graphics (e.g., text, video, etc.), communicate audio (e.g., send and receive audio) and/or communicate with a network (wired or wirelessly). In some embodiments, one or more of the user devices 106a-106n may be implemented as a smartphone, a smart watch, a tablet computing device, a phablet, a desktop computer, a laptop computer, a netbook, etc. The user devices 106a-106n may be configured to execute instructions to provide an app that enables communication between the user devices 106a-106n and the devices 102a-102n. The type of devices implemented as the user devices 106a-106n may be varied according to the design criteria of a particular implementation.

A speech bubble 108 is shown. The speech bubble 108 may be a greeting generated by the devices 102a-102n (e.g., an audio message). The devices 102a-102n may comprise an audio output device (e.g., an audio processor and/or a speaker) to generate audio and/or the speech 108. In the example shown, the speech 108 may be a greeting. The devices 102a-102n may be configured to use artificial intelligence to generate context-relevant speech (e.g., a greeting when a visitor is detected, a personalized greeting when a resident is detected, delivery instructions when a package is detected, etc.). The devices 102a-102n may be configured to implement sensor fusion to make inferences based on various sensor readings. The sensor fusion may enable inferences to be made by combining sensor readings from disparate sources that would not be able to be determined from reading one of the sensor readings alone. Implementing the sensor fusion may enable the devices 102a-102n to implement a conversational artificial intelligence.

Dotted lines 110a-110b are shown. The dotted lines 110a-100b may represent a field of view of the camera implemented by the devices 102a-102n. The field of view 110a-110b may capture the user 50. The devices 102a-102n may be configured perform video analysis on the user 50 to determine an identity of the user 50. For example, one or more features (e.g., the face, the height, the gait, etc.) of the user 50 may be detected by the devices 102a-102n and compared with stored features. The video analysis may be used to determine one or more authentication factors.

A signal (e.g., AUTH) is shown. The signal AUTH may represent an authentication and/or classification of the user 50. The devices 102a-102n may be configured to perform the authentication of the user 50. In one example, the identification performed by the audio analysis may implement the authentication. Other sensors implemented by the devices 102a-102n may be configured to provide evidence and/or confidence for the authentication. For example, video analysis, voice detection, RFID, etc. may be implemented to perform the authentication. In some embodiments, the speech 108 may respond to the authentication (e.g., the authentication may provide the identity of the user 50, and the speech 108 may be configured to greet the user 50 by name based on the identification).

The authentication may be configured to enable the devices 102a-102n to receive commands from the user 50.

In one example, if the user 50 has been authenticated, the user 50 may provide voice-based commands. For example, there may be a list of voice commands that homeowners would like to have while outside the home. To enable voice commands outside the home, authentication may be implemented. With authentication, the voice commands may be configured to provide wireless control of various network-connected devices (e.g., door locks, garage door openers, outdoor lighting, keeping the devices quiet, arm/disarm door alarm systems, etc.). The devices 102a-102n may be configured to receive the commands, and then perform a functionality corresponding to the commands The functionality corresponding to the received commands may be performed by one or more of the network-connected devices. The devices 102a-102n may communicate (e.g., wirelessly) the commands to the network-connected devices.

A robust and easy outdoor authentication process may be valuable to all outdoor IoT devices (e.g., door locks). Robust and easy authentication may rely on two or more data points and/or signals (e.g., sensor fusion). Once visitors are authenticated (e.g., against a white list of approved visitors such as family and friends), other detected visitors may be considered 'unfamiliar' and/or 'unwanted' visitors. Commands provided by unfamiliar, unknown and/or unwanted visitors may not be performed by the devices 102a-102n. For example, in an outdoor environment any person may walk up to the devices 102a-102n and attempt to issue a command. The authentication provided by the devices 102a-102n may prevent unwanted commands and/or ensure that only approved users can provide the commands.

The system 100 may be configured to provide a response to a voice command and perform voice authentication. The devices 102a-102n may implement a hub that provides a connection to the Internet (e.g., the network 60) and provides control to other network connected devices (shown in association with FIG. 2). For example, one or more of the devices 102a-102n may perform an authentication and initiate a command in response to a voice command. The command may be initiated by controlling another network connected device such as a door lock.

Generally, one or more of the devices 102a-102n and/or one or more of the internet-connected devices may implement a microphone (e.g., for voice authentication and/or to receive the voice command). In some embodiments, voice authentication alone may be inadequate to authenticate a user and the devices 102a-102n may perform other types of authentication (e.g., authentication factors) for security. For example, the devices 102a-102n may receive multiple input signals for authenticating the visitor 50 (e.g., audio input, video input, motion input, etc.).

Performing a first authentication using voice analysis and using additional authentication factors may provide reliable authentication (e.g., 2-pass authentication, 3-pass authentication, etc.). The first authentication and other authentication factors may adjust a confidence level of the authentication. When the confidence level is determined to be above a threshold (e.g., 99% confidence) then the user may be authenticated. The confidence level may represent a likelihood that the identity of the visitor 50 determined is correct.

One or more of the devices 102a-102n may receive an audio input (e.g., capture a voice) from the visitor 50 and perform a voice analysis to authenticate the visitor 50. The audio input may comprise a voice command to control the devices 102a-102n and/or other network-connected devices. In one example, the visitor 50 may approach one of the devices 102a-102n and speak, "This is Alice, 3467". The authentication may comprise recognizing the voice of the visitor 50 (e.g., recognizing the voice as Alice). Other authentication factors may comprise a passphrase (e.g., correlating the spoken name of Alice to the vocal signature of Alice, correlating a code number to a code association with Alice). In the example, providing the code (e.g., 3467) may also provide a known command. For example, the code 3467 may be understood by the devices 102a-102n to be a command to open the door.

Generally, the audio input may be captured by the devices 102a-102n and/or an internet-connected device with a microphone wirelessly connected to the devices 102a-102n. In some embodiments, video analysis may be implemented as an additional authentication factor (e.g., to improve authentication accuracy). Further authentication factors may comprise facial recognition, a barcode, hand gestures, height of visitors, etc.

Figure 2:
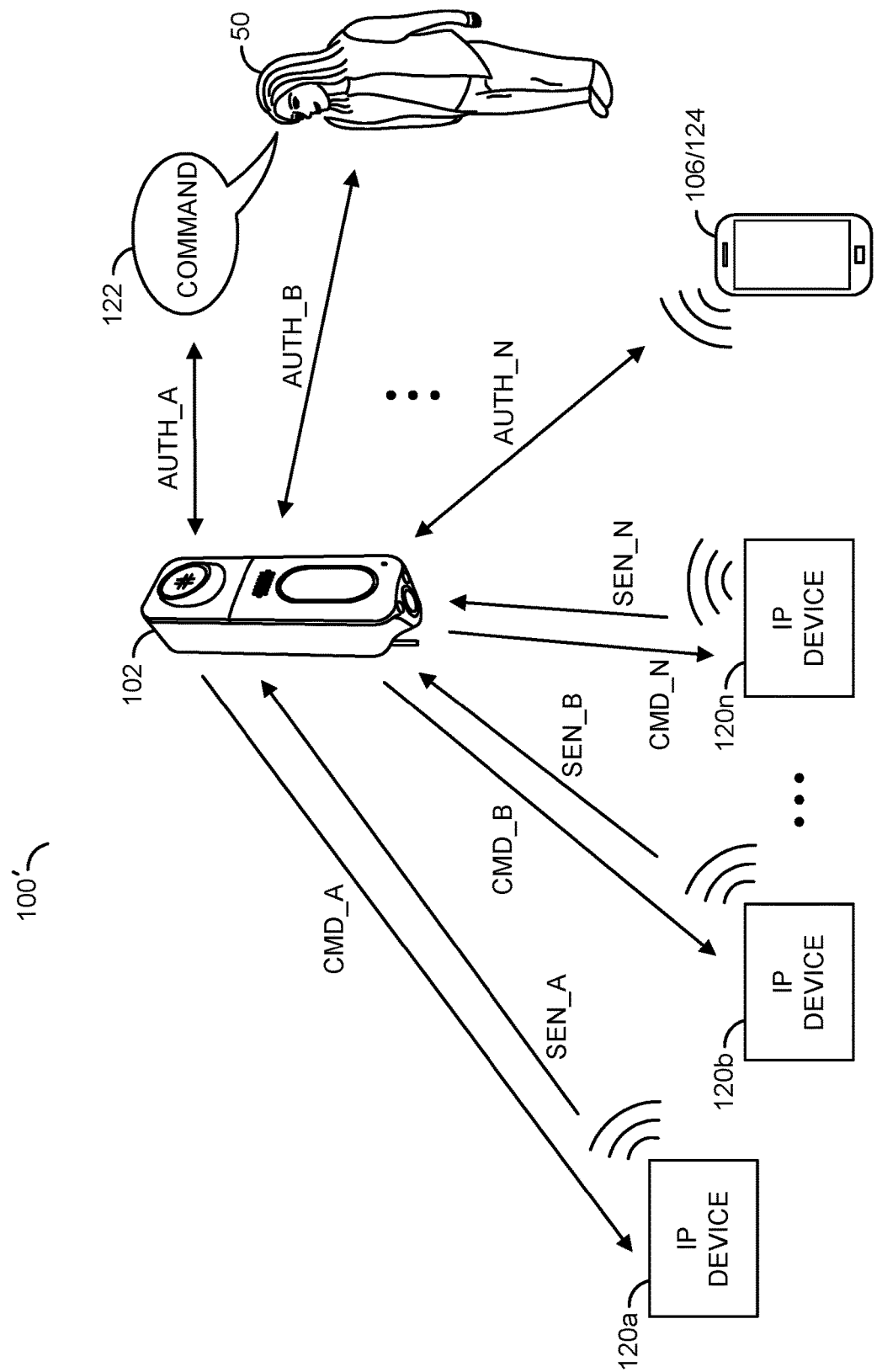
FIG. 2 is a diagram illustrating an example embodiment performing a command in response to an authenticated input.

Referring to FIG. 2, a diagram illustrating an example embodiment performing a command in response to an authenticated input is shown. The system 100' is shown. The system 100' shown may provide additional details of the system 100 shown in association with FIG. 1. The system 100' may comprise the device 102. The device 102 may be a representative example of the devices 102a-102n shown in association with FIG. 1. The system 100' may comprise one or more blocks (or circuits) 120a-120n. The circuits 120a-120n may implement network-connected devices (e.g., IP devices, IoT devices, etc.). The number, arrangement and/or types of devices of the system 100' may be varied according to the design criteria of a particular implementation.

The user 50 is shown. A speech bubble 122 is shown. The speech bubble 122 may correspond to speech provided by the user 50 (e.g., audio input). A block (or circuit) 124 is shown. The circuit 124 may be a user device in the possession of the user 50. In some embodiments, the circuit 124 may be one of the user devices 106a-106n shown in association with FIG. 1.

A number of signals (AUTH_A-AUTH_N) are shown. The signals AUTH_A-AUTH_N may be authentication signals having a similar implementation as the signal AUTH shown in association with FIG. 1. The device 102 may be configured to perform a multi-factor authentication. The multi-factor authentication may be implemented to adjust a confidence level for the authentication. For example, each factor of the authentication may be analyzed by the device 102 to adjust (e.g., increase/decrease/no change) the confidence level. Whether the user 50 is authenticated may be determined in response to the aggregate confidence level of each authentication factor.

Various factors may be analyzed by the device 102 to perform the authentication of the user 50. In the example shown, the signal AUTH_A may correspond to the speech 122. The device 102 may analyze the speech (e.g., a passphrase) and/or voice of the user 50 (e.g., vocal patterns, voice biometric markers, etc.) as one factor for authenticating the user 50. In the example shown, the signal AUTH_B may correspond to the user 50. The device 102 may analyze the characteristics of the user 50 based on video analysis (e.g., facial recognition, gait recognition, height detection, etc.). In the example shown, the signal AUTH_N may correspond to the smartphone 124. The device 102 may analyze the smartphone 124 (e.g., detect a MAC address, provide a notification that the user 50 can respond to, etc.). The number and/or methods of authentication may be varied according to the design criteria of a particular implementation.

The device 102 may compare the data received via the signals AUTH_A-AUTH_N may to known values for the corresponding authentication factors. The known values may be information that corresponds to one or more users on a white list (e.g., an approved list of users). In some embodiments, the known values may be stored by the device 102 and the comparison may be performed by the device 102 to classify the user 50 as a person on the approved list of users. In some embodiments, the known values may be stored by the cloud service 104 and the device 102 may upload the signals AUTH_A-AUTH_N to the cloud service 104, the cloud service 104 may perform the comparison and provide the results to the device 102.

In one example, the signal AUTH_A may be compared to the known factor of stored voices. If the voice 122 matches one or more of the known stored voices, the device 102 may increase the confidence level for each user identity that corresponds to the matches voices). In an example, the signal AUTH_A may have a 0% match for stored identity A, a 25% match for stored identity B, a 100% match for stored identity C and a 60% match for stored identity D. Since stored identity A and stored identity B have a low probability match, the device 102 may lower the confidence level for stored identity A and stored identity B. Since stored identity C and stored identity D have a higher probability match, the device 102 may increase the confidence level for stored identity C and stored identity D.

Continuing the example, the facial analysis of the signal AUTH_B may be compared to one or more stored faces and the signal AUTH_B may have a 0% match for the stored identity A, a 0% match for the stored identity B, a 90% match for the stored identity C and a 25% match for the stored identity D. Since the stored identity A, the stored identity B and the stored identity C have a low probability match for the signal AUTH_B, the device 102 may lower the confidence level for stored identity A, the stored identity B and the stored identity D. Since stored identity C has a higher probability match for the signal AUTH_B, the device 102 may increase the confidence level for the stored identity C.

Continuing the example, the MAC address of the signal AUTH_N may be compared to one or more stored MAC addresses and the signal AUTH_N may have a 0% match for the stored identity A, a 0% match for the stored identity B, a 100% match for the stored identity C and a 0% match for the stored identity D. Since the stored identity A, the stored identity B and the stored identity C have a low probability match for the signal AUTH_N, the device 102 may lower the confidence level for stored identity A, the stored identity B and the stored identity D. Since stored identity C has a higher probability match for the signal AUTH_N, the device 102 may increase the confidence level for the stored identity C.

Similarly, the device 102 may perform analysis, comparisons and/or adjustments to the confidence level for each of the signals AUTH_A-AURH_N. Some factors may have a higher or lower weighting when determining an aggregate confidence level. In one example, if facial analysis is considered unreliable technology, the confidence level determined for the factor AUTH_B may have a lower weight for the aggregate confidence level. In another example, the MAC address may have a higher weight for the aggregate confidence level. The amount of weight for each factor may be varied for each specific scenario (e.g., facial recognition may have a low weight if the face of the user 50 is obscured, but may have a higher weight if the face of the user 50 is looking directly at the camera).

If the confidence level for one the stored identities is high enough (e.g., above a threshold value for the confidence level), then the device 102 may authenticate the user. Continuing the example, the stored identity A, the stored identity B and the stored identity D may have a low aggregate confidence level for matching the user 50. The stored identity C may have a high confidence level for matching the user 50. If the aggregate confidence level for the stored identity C is above the threshold level, then the device 102 may authenticate the user 50. If none of the stored identities are above the pre-determined confidence level threshold then the user 50 may not be authenticated.

The device 102 is shown communicating corresponding signals (e.g., CMD_A-CMD_N) to the IP devices 120a-120n. The IP devices 120a-120n are each shown communicating a corresponding signal (SEN_A-SEN_N) the device 102. The signals CMD_A-CMD_N may represent a communication of a command from the device 102 to the IP devices 120a-120n. The signals SEN_A-SEN_N may represent a communication of sensor readings from the IP devices 120a-120n to the device 102.

The IP devices 120a-120n may be configured to execute computer readable instructions. Executing the computer readable instructions may enable the IP devices 120a-120n to perform one or more types of functionality (e.g., tasks). Each of the IP devices 120a-120n may be configured to perform one or more types of functionality. In one example, the functionality may be to capture video data. In another example, the functionality may be to detect motion. In yet another example, the functionality may be to read soil moisture levels. In still another example, the functionality may be to water a lawn according to a schedule. The number and/or types of functionality implemented by the IP devices 120a-120n may be varied according to the design criteria of a particular implementation.

One or more of the IP devices 120a-120n may be configured as sensors. The sensors implemented by the IP devices 120a-120n may be configured to read sensor data. The sensor data read and/or captured by the IP devices 120a-120n may be communicated to the device 102 via the signals SEN_A-SEN_N.

The device 102 may be configured to issue commands to the IP devices 120a-120n. The commands CMD_A-CMD_N may provide instructions and/or interrupt requests to the IP devices 120a-120n. In one example, the IP devices 120a-120n may be configured to independently perform the functionality (e.g., water a lawn according to a schedule based on the time of day). The IP devices 120a-120n may perform the scheduled tasks without additional instruction (e.g., independently follow the schedule). The commands CMD_A-CMD_N may provide direct control over the IP devices 120a-120n. For example, the signals CMD_A-CMD_N may change and/or adjust the functionality of and/or how the functionality is performed by the IP devices 120a-120n. In an example, if the IP device 120a is configured to initiate lawn irrigation at a particular time of day, the signal CMD_A may provide instructions to immediately turn on the irrigation system (e.g., override the schedule).

In some embodiments, the device 102 may be configured to generate the signals CMD_A-CMD_N based on the sensor data SEN_A-SEN_N. In one example, if the IP device 120a is implemented as a soil moisture sensor, and the signal SEN_A indicates that the moisture level for the soil is low, then the device 102 may generate the signal CMD_B to instruct the IP device 120b (e.g., implementing an irrigation control system) to initiate watering the lawn. Similarly, the device 102 may be configured to generate one or more of the signals CMD_A-CMD_N in response to sensor data implemented by the device 102. For example, the device 102 may implement a motion sensor, and when motion is detected the device 102 may communicate the signal CMD_C to communicate to the IP device 120c (e.g., implementing a smart light bulb) to turn on a light.

The user 50 may provide user commands to the device 102. In one example, the user 50 may provide voice commands. In another example, the user 50 may provide a user command to the device 102 via an app implemented on the smartphone 106. The device 102 may interpret the user command provided by the user 50 and generate one or more of the signals CMD_A-CMD_N in response to the interpreted command. In the example shown, speech 122 may be a voice command. The device 102 may interpret the voice command and generate one or more of the signals CMD_A-CMD_N in response to the voice command 122.

The device 102 may only generate the commands CMD_A-CMD_N in response to voice commands provided by the user 50 if the user 50 has been authenticated. In one example, the device 102 may ignore the voice command if the user 50 has not been authenticated. In another example, the device 102 may provide the communication 108 (e.g., a recorded message indicating that the user 50 does not have authorization to provide the command), if the user 50 has not been authenticated. In one example, the voice command 122 may provide the voice command and the authentication. For example, the device 102 may analyze the voice of the voice command 122 to authenticate the user 50. If the user 50 is not authenticated, then the device 102 may not perform the voice command 122. If the user 50 is authenticated, then the device 102 may interpret the voice command 122 and generate the signals CMD_A-CMD_N.

The device 102 and/or the IP devices 120a-120n may implement functionality such as lights, camera, door lock control, irrigation control, etc. In an example, the IP devices 120a-120n may function together via the device 102 to implement a light controlled by a camera, a door lock controlled by a camera, and/or an irrigation system controlled by a camera. The device 102 may combine various functionality (e.g., a camera implemented by the device 102) of the device 102 with the various functionality of each of the IP devices 120a-120n via wireless signals. The device 102 may operate as an outdoor hub configured to control the functionality of the IP devices 120a-120n. Using the AI-based authentication of users, the device 102 may operate as the outdoor hub to enable the benefits of voice commands to control the IP devices 120a-120nj that would otherwise be unable to respond to voice commands. For example, the IP devices 120a-120n may be simple (e.g., low-cost, low feature) devices (e.g., incapable of interpreting voice commands) that may be controlled by the device 102 (e.g., a device that is capable of interpreting voice commands).

In one example, for authenticated users (e.g., if the user 50 is on a whitelist), the user 50 may issue a command such as "Kung, keep quiet" to prevent notifications for a particular amount of time (e.g., an hour, no alerts, no greetings, no lights, etc.). In another example, the user 50 may issue a command such as "Kung, open the door" (e.g., one of the IP devices 120a-120n may be configured to lock or unlock a door lock). In yet another example, the user 50 may issue a command such as "Kuna, turn on the lights" (e.g., one of the IP devices 120a-120n may be configured to control a light bulb). In still another example, the user 50 may issue a command such as "Kung, open the garage 1 foot" (e.g., one of the IP devices 120a-120n may operate a garage door opener). In another example, the user 50 may issue a command such as "Kuna, tell Beatrice that I am outside to wash the car" (e.g., the device 102 may record the audio from the user 50 to be played back by another authenticated user).

The authentication may be determined based on a 2D facial recognition in combination with a voice (e.g., performing audio analysis to determine a voice based on biometric analysis) and/or stating a name as a soft password). The authentication may be configured to control an alarm control panel and/or a door. The video and/or audio analysis may be combined with other sensor data and/or manual input of a password (e.g., authentication based on multiple factors), such as a numerical password.

In some embodiments, the visitor 50 may be detected based on the seashell effect of a visitor shape on resonances of the environment (e.g., porch resonance). In an example, an active swept frequency audio stimulus may be presented by the speaker (e.g., a bat ear echo detection). Ultrasonic, near ultrasonic and/or an audible chirp may be emitted and the return signal may be analyzed to determine dimensions of the visitor 50 and/or if the visitor 50 is carrying a package.

In some embodiments, WiFi and/or Bluetooth Received Signal Strength Indication (RSSI) levels from multiple AP directions, phones, cars, etc. may be analyzed to determine the attenuation of signals from different directions that occur as a visitor drives up to the home and/or walks up to towards the door, doorbell and/or light fixture antenna. In an example, a resident that parks the same car in the same place in the driveway may cause changes to the reflected and/or attenuated signals from the access points of the resident and/or neighboring home. The RSSI levels may be detected and/or recognized. The RSSI may add to the confidence level of detecting a visitor (e.g., the resident drives the same car daily and parks in the same place, causing similar RSSI levels daily). The additional data point may increase confidence for performing the action (e.g., enabling more security for passive unlocking of the access points).

The system 100' may enable an integration of camera functionality with door lock control. Since the device 102 may be powered using a wire, the camera functionality may not drain a battery of one of the IP devices 120a-120n. The camera and video analysis and/or audio analysis may enable AI detection that would not be otherwise available to the IP devices 120a-120n. Furthermore, the device 102 may have more physical space available for a higher quality camera than would be available for a low cost IP device 120a-120n. The system 100' may enable the user 50 to provide commands using convenient vocal commands as well as through a phone app. The device 102 may be configured to provide a high confidence authentication with wireless integration between the device 102 and the IP devices 120a-120n. The system 100' may provide convenience, wired-power for advanced authentication methods, reduced cost and reduced power usage for locks to connect to internet.

Similarly, the system 100' may enable an integration of an outdoor authentication with a garage door opener. Since the device 102 may be an outdoor device and one or more of the IP devices 120a-120n may operate as a garage door opener, the system 100' may provide an alternate to indoor only smart hubs and/or app-controlled devices. The system 100' may enable a detection of a delivery person and open the garage door a small amount (e.g., 1 foot high) for package delivery, then close the garage door after the delivery is made (e.g., secure storage of packages for delivery).

In some embodiments, the system 100' may enable an integration of an outdoor authentication with a smart irrigation system. For example, many homeowners decide to water the lawn when they are outside and see that the lawn needs watering. The outdoor device 102 may enable the user 50 to control one of the IP devices 120a-120n operating as a wireless irrigation system control (e.g., "Kuna, sprinkler on for 5 minutes"). Similarly, when the homeowner is outside (e.g., hosting a barbeque party) the homeowner may realize that it is getting dark outside. The system 100' may enable the user 50 to provide a voice command to control the IP devices 120a-120n that may operate as a smart light (e.g., "Kuna, turn on the yard light", "Kuna, turn off the outdoor lights after 10 pm", etc.).

In some embodiments, the system 100' may enable an integration with outdoor lighting. For example, the system 100' may not rely on a phone app for control and may work with outdoor lighting instead of indoor only lighting. For example, the device 102 and/or the IP devices 120a-120n may be weatherproofed and/or meet regulations for outdoor usage. Instead of using an indoor light switch to control outdoor lighting, control of the outdoor lighting may be managed by the commands of the device 102. The authentication may ensure that only particular approved people are able to control the lighting. For example, the voice command 122 may be "Kuna, turn on the yard light" or "Kuna, turn off door light 2".

Referring to FIG. 3, a diagram illustrating an example embodiment of an outdoor hub is shown. The device 102 may be a multi-functional device that comprises at least a video/image recording function and/or an audio recording/playback function. The device 102 may be configured as an outdoor wireless hub. In the example shown, the device 102 may be a smart security doorbell camera (e.g., configured to generate video recordings of visitors approaching and/or entering a premises). In another example, the device 102 may be implemented as a smart security light. In some embodiments, the device 102 may be implemented as an outdoor security device (e.g., a doorbell security camera mounted to the outside of the home). In some embodiments, the device 102 may be implemented as an indoor security device. The implementation and/or the functionality of the device 102 may be varied according to the design criteria of a particular implementation.

The device 102 may comprise a housing 154. The housing 154 may be configured to encase various components of the device 102 (e.g., electronics configured to implement and/or facilitate the implementation of features). The housing 154 may be molded together and/or snapped together to form a single enclosure. In some embodiments, the housing 154 may be non-removable. The housing 154 may comprise various openings to enable and/or facilitate functionality of the device 102 (e.g., openings for speakers, microphones, cables, camera lenses, etc.).

In the example shown, the device 102 may comprise various components. The device 102 is shown comprising a component 150, a component 152, a component 156, a component 158, a component 160, a component 162, components 164a-164b and/or a component 166. The components 150-166 may enable the various functionality and/or features for the device 102. In the example shown, the component 152 may implement a lens, the component 156 may implement status lights and/or a microphone grille, the component 158 may implement a speaker grille, the component 160 may implement a button (e.g., a doorbell), the component 162 may implement a status light, the components 164a-164n may implement lights (e.g., for illumination and/or infrared lighting) and/or the component 166 may implement a power cable. In one example, the speaker grille 158 may facilitate an audio playback feature by allowing sound waves generated by a speaker component (e.g., the audio output device) within the housing 154 to easily pass through the housing 154 (e.g., provide good sound quality). In another example, the button 160 may enable a doorbell feature by providing a contact that activates the doorbell. The number, type, design, layout and/or functionality of the components 150-166 may be varied according to the design criteria of a particular implementation.

The component 150 may implement a camera lens opening. The component 150 is shown having an oblong shape. For example, the oblong shape of the component 150 may have a larger width dimension than height dimension. The lens opening 150 may be configured to accept light for a capture device (e.g., a camera sensor). The lens opening 150 may be configured to provide protection for an internal component of the device 102 (e.g., the capture device). In an example, a lens (e.g., a wide-angle lens) and an image sensor (described in association with FIG. 5) may be located behind the lens opening 150.

Dotted lines 170 are shown extending from the lens opening 150. The dotted lines 170 may represent a capture area (e.g., field of view) for the capture device located behind the lens opening 150. In the example shown, the field of view 170 may be a truncated rectangular pyramid. The shape of the field of view 170 may generally match the shape of the lens opening 150 (e.g., the width of the field of view 170 may be greater than the height of the field of view 170). Similarly, dotted lines 172a-172b are shown extending from the lens 152. The dotted lines 172a-172b may represent a capture area (e.g., field of view) for a capture device located behind the lens 152. In the example shown, the lens 152 may have a circular shape. In the example shown, the device 102 may implement a dual-camera security device configured to capture two separate capture areas (e.g., provide two different views).

Referring to FIG. 4, a diagram illustrating an alternate view of the outdoor hub is shown. A front view of the device 102 is shown. The front view of the device 102 may show the lens opening 150, the lens 152, the microphone grille 156, the speaker grille 158, the button 160, the status light 162 and/or the lights 164a-164b.

The lens 150 is shown having the oblong shape. The lens 150 may be horizontally centered on the device 102. In some embodiments, the lens 150 may be implemented having a tilt. The tilt of the lens 150 may be configured to accommodate an angle of the image sensor of the capture device within the device 102. In one example, the lens 150 may have a 5 degree tilt (e.g., upwards) to capture a view with a different capture area than the capture area of the lens 152 (e.g., so that video data captured may provide a view of faces of visitors). For example, the device 102 may enable capturing a head-to-toe image of a person using a combination of the view captured using the lens opening 150 and the lens 152.

The device 102 may be implemented having a thin profile. For example, the device 102 may be relatively tall compared to the width. The thin profile of the device 102 may impose size and/or space restrictions for the components 150-166 and/or the lens 150. One example of the functionality of the device 102 may be implemented by the capture device located behind the lens opening 150. For example, the capture device may be a wide angle camera. In some embodiments, the device 102 may be implemented as a video doorbell. Implementing the device 102 with a thin profile may restrict the amount of room (e.g., the device 102 may not provide enough space for adding a clear glass cover over the entire device). In an example, the device 102 may be configured to implement the functionality of an outdoor camera and the lens opening 150 may be configured to minimize a "greenhouse effect" of clear lens cover with minimal air trapped by the lens cover.

The lens opening 150 may have a relatively small height compared to width (e.g., an oblong shape). The oblong shape of the lens opening 150 may reduce a size footprint of the lens opening 150 on the front face of the device 102. A small height for the lens opening 150 may enable more components (e.g., which allows for greater functionality) to fit on the front face of the device 102. If the lens opening 150 had a larger height, the larger height may occupy more space that could be used for other components.

In the example shown, the shape of the lens opening 150 may have rounded corners. In some embodiments, the shape of the lens opening 150 may have edged corners (e.g., rectangular corners that meet at a 90 degree angle). In some embodiments, the shape of the lens opening 150 may have a combination of rounded and edged corners. The shape of the corners may be cosmetic. The lens opening 150 may have a width dimension greater than a height dimension.

Figure 5:
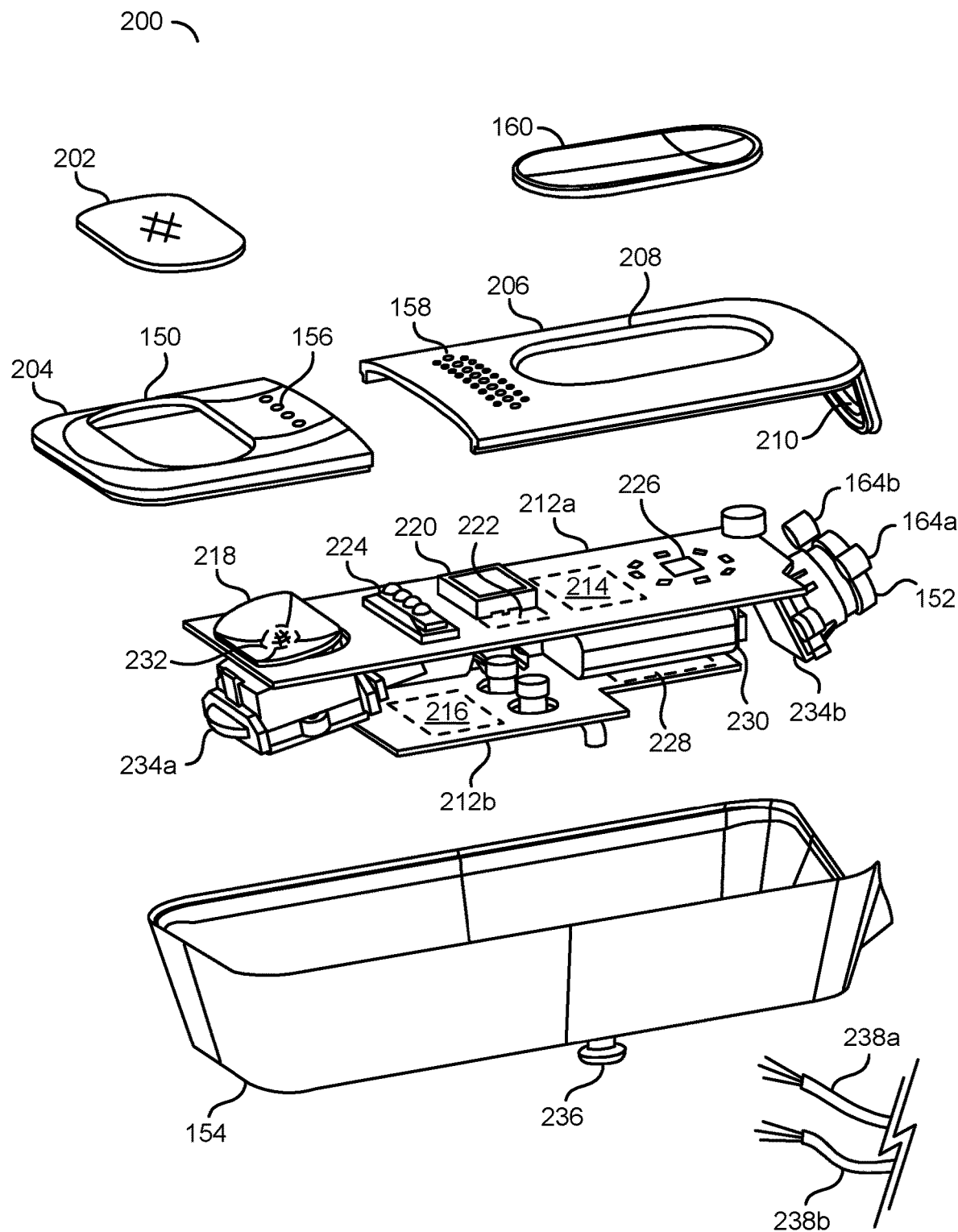
FIG. 5 is a diagram illustrating an exploded view of the outdoor hub.

Referring to FIG. 5, a diagram illustrating an exploded view of the outdoor hub is shown. The exploded view 200 may illustrate various components internal to the device 102. The internal components of the device 102 may provide the various functionality and/or implement various features of the device 102.

An object 202 is shown. The object 202 may be a protective cover for the lens opening 150. The cover 202 may have a size and shape that matches the size and shape of the lens opening 150 (e.g., a width may be greater than the height). The cover 202 may be implemented as a clear material (e.g., to provide protection while still allowing light to reach the image sensor). In one example, the clear material of the cover 202 may be implemented as a piece of glass. In another example, the cover 202 may be implemented as a piece of clear plastic. The cover 202 may not provide a removable, opaque shutter. The implementation of the cover 202 may be varied according to the design criteria of a particular implementation.

The housing 154 is shown. In the example shown, the housing 154 is hollow. The hollow housing 154 may be configured to provide a protective enclosure for the components of the device 102. The enclosure 154 is shown separated. An upper faceplate 204 and a lower faceplate 206 are shown. The upper faceplate 204 and the lower faceplate 206 may provide a front face of the housing 154. Together, the upper faceplate 204, the lower faceplate 206 and the housing 154 may provide the protective and/or decorative enclosure for the internal components of the device 102. The upper faceplate 204 and/or the lower faceplate 206 may implement a body plate for the device 102. The upper faceplate 204 and/or the lower faceplate 206 may provide a front cover for the housing 154. In the exploded view 200, the upper faceplate 204, the lower faceplate 206 and the housing 154 are shown as separated (e.g., for illustrative purposes). However, the upper faceplate 204, the lower faceplate 206 and the housing 154 may form a single enclosure for the device 102. In some embodiments, the upper faceplate 204, the lower faceplate 206 and the housing 154 may snap together. In some embodiments, the upper faceplate 204, the lower faceplate 206 and the housing 154 may be molded together, fused together and/or permanently adhered together. In one example, the upper faceplate 204 may be non-removable.

The upper faceplate 204 may comprise the microphone grille 156 and/or the lens opening 150. The lower faceplate 206 may comprise the speaker grille 158, an opening 208 and an opening 210. The microphone grille 156 and/or the lens opening 150 may be implemented as an integrated portion of the upper faceplate 204. For example, the lens opening 150 may not be removed from the upper faceplate 204. The speaker grille 158, the opening 208 and/or the opening 210 may be implemented as an integrated portion of the lower faceplate 206. Generally, the lens opening 150 may not be removable from the upper faceplate 204 and/or the housing 154.

The opening 208 may provide a space for the button 160 to fit into the opening 208. For example, when the button 160 is pressed, the opening 208 may allow the button 160 to move into the housing 154 to make contact with a component of the device 102. The opening 210 may provide a space for the lights 164a-164b and/or the lens 152.

Various components of the device 102 are shown in the exploded view 200. Circuits 212a-212b are shown. The circuits 212a-212b may provide interconnections and/or mounting locations for the various components of the device 102. The various components of the device 102 may fit within a limited amount of vertical space of the housing 154. A block (or circuit) 214 is shown implemented on the circuit 212a. The circuit 214 may implement a processor. For example, the circuit 214 may be a video processing device configured generate video data from the image sensor. A block (or circuit) 216 is shown implemented on the circuit 212b. The circuit 216 may implement a wireless communication device. The wireless communication device 216 may enable the device 102 to transmit and/or receive data wirelessly (e.g., connect to the IP devices 120a-120n and/or the internet 60). A lens housing 218 is shown. A lens 232 is shown. The circuits 234a-234n may implement image sensors.

The image sensors 234a-234b may implement video capture device. In an example, the image sensors 234a-234b may be rectangular with a 16:9 aspect ratio. The image sensor 234a-234b may receive light within the truncated rectangular pyramid field of view 170 and/or 172a-172b. The image sensors 234a-234b may be configured to convert received light into computer readable data (e.g., pixels that comprise video frames). The image sensors 234a-234b may be implemented to record video data. The lens 232 may correspond with the image sensor 234a. The lens 232 may be configured to focus incoming light onto the image sensor 234a. The lens 232 may be a wide-angle lens. In an example, the lens 232, the image sensor 234a and/or other circuits may implement a capture device.

The lens housing 218 may be a housing for the front wide angle lens 232. The cover 202 may fit over top of the lens housing 218 and the lens 232 may be behind the cover 202. The lens housing 218 may isolate the wide angle lens 232 from other components of the device 102.

The circuit 212a may further comprise a block (or circuit) 220, a block (or circuit) 222, a block (or circuit) 224 and/or a block (or circuit) 226. The circuit 220 may implement a speaker (e.g., the audio output device). The circuit 222 may implement an audio processor. The circuit 224 may implement a microphone (e.g., the audio input device). The circuit 226 may implement a fingerprint scanner. The circuit 212b may further comprise a block (or circuit) 228 and/or a block (or circuit) 230. The circuit 228 may implement storage (e.g., memory). The circuit 230 may implement a power storage/power conversion (e.g., a battery, an AC power converter, voltage regulation, etc.). A connector 236 is shown attached to the housing 154. The power cable(s) 166 may provide power via the connector 236. For example, the connector 236 may connect to the power storage/power conversion device 230 to provide an external power supply. In some embodiments, the power connectors may be a USB power connection. In the example shown, the connector 236 may be a T-Terminal (e.g., with the wires 238a-238b as a source power supply for the premises) connection. In an example, for a doorbell style security device 102, the T-Terminal connection may be implemented (e.g., most doorbells use a T-Terminal connection). The circuits 212a-212b may comprise other components (not shown). The components 214-236 may be implemented on either of the circuits 212a-212b (e.g., based on physical space constraints, heating constraints, operating condition constraints, etc.). The number, type and/or arrangement of the components 214-236 may be varied according to the design criteria of a particular implementation.

The circuits 212a-212b and/or the components 214-236 may be entirely and/or partially enclosed within the housing 154 (and the upper faceplate 204 and the lower faceplate 206). The components 214-236 may provide the functionality of the device 102. In some embodiments, the components 214-236 may implement the functionality for a smart security camera. In one example, the speaker 220 and the audio processing device 222 may be configured to generate audio for communicating to a visitor and the microphone 224 may be configured to receive audio (e.g., to enable 2-way communication). In another example, the fingerprint scanner 226 may be configured to identify a visitor that presses the button 160 based on a fingerprint. Details of the functionality of the circuits 212a-212b and/or the various components 214-236 may be described in U.S. patent application Ser. No. 16/143,853, filed on Sep. 27, 2018, appropriate portion of which are hereby incorporated by reference in their entirety.

The size of the opening 150 may affect the number of components 214-236 that may be implemented by the device 102. For example, the hollow housing 154 may have a limited amount of space. To provide functionality, the components 214-236 may need to fit within the constraints of the hollow housing 154. If the size of the opening 150 takes up too much space, one or more of the components 214-236 may be unable to fit within the constraints of the hollow housing 154.

Figure 6:
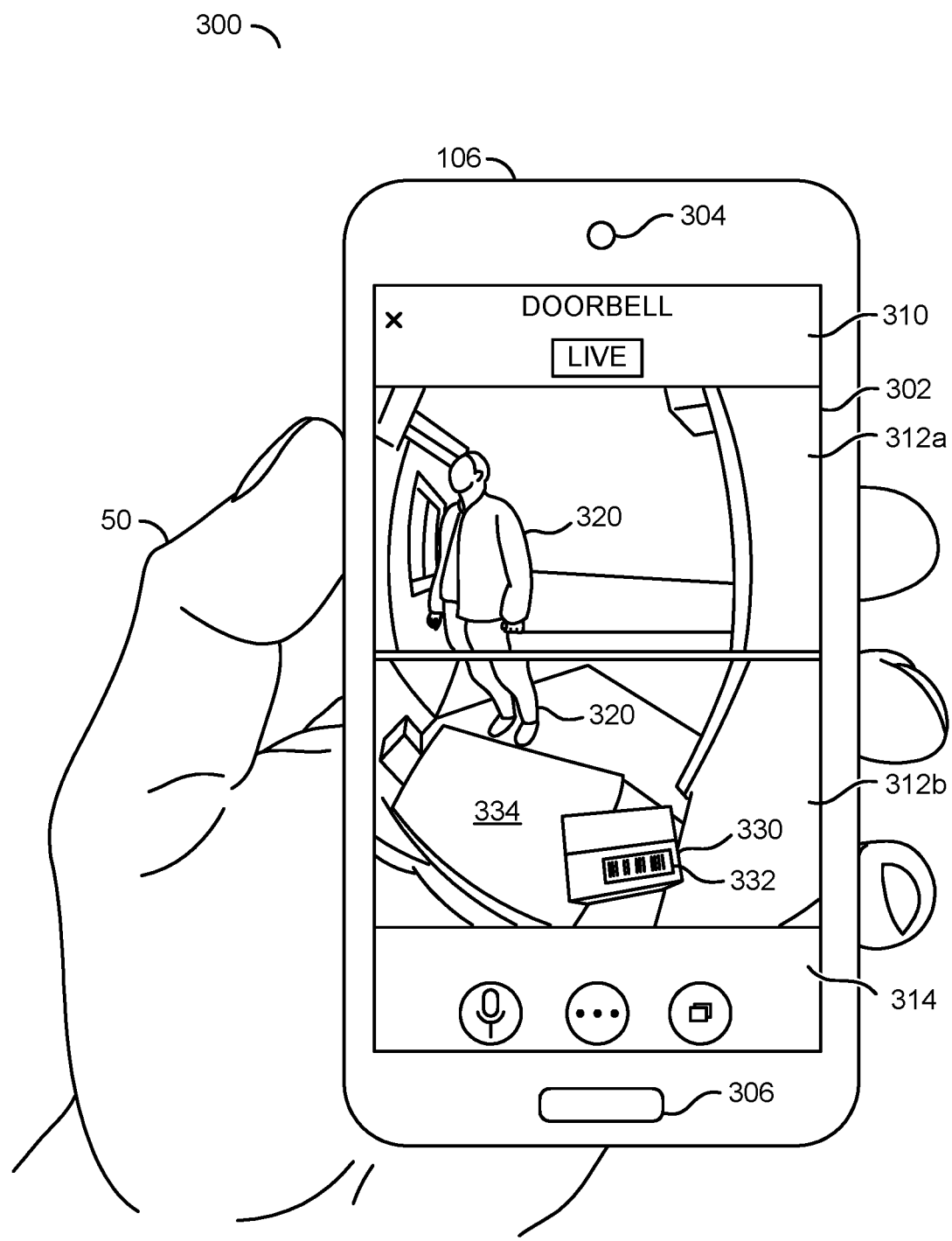
FIG. 6 is a diagram illustrating a dual view video capture displayed on a user device.

Referring to FIG. 6, a diagram illustrating a dual view video capture displayed on a user device is shown. An example context 300 of the invention is shown. In the example context 300, the user device 106 is shown held by a user 50 (e.g., a homeowner). For example, the user device 106 may be a portable (e.g., handheld) device (e.g., one of the user devices 106a-106n shown in association with FIG. 1). In the example shown, the user device 106 may be a smartphone.

The smartphone 106 is shown having a display 302, a speaker 304 and a microphone 306. In an example, the display 302 may be a touchscreen display enabling the user 50 to view output from the smartphone 106 and/or provide input (e.g., touch controls) to the smartphone 106. The speaker 304 may playback audio. The microphone 306 may receive audio. In an example, the speaker 304 and the microphone 306 may enable the user 50 to interact with the device 102 as a two-way intercom. In one example, the speaker 304 on the smartphone 106 may playback audio captured by the microphone component 224 and wirelessly transmitted by the device 102. In another example, the microphone 306 on the smartphone 106 may capture audio that may be wirelessly transmitted to the device 102 and the device 102 may playback the audio (e.g., using the speaker component 220).

The display 302 is shown displaying a companion application 310. The device 102 may be compatible with the companion application 310. For example, the companion application 310 may be a smartphone app (e.g., iOS app, an Android app). In some embodiments, the companion application 310 may be a computer program (e.g., for Windows, macOS, Linux, etc.). The companion application 310 may enable the user 50 to remotely interact with the features of the device 102. For example, the companion application 310 may be configured to interface with the smartphone microphone 306 and speaker 304 to enable the user 50 to use the device 102 as an intercom (e.g., audio received by the smartphone 106 may be played by the speaker 220 of the device 102 and audio received by the microphone of the device 102 may be played back to the user by the smartphone speaker 304).

In the example shown, the companion application 310 shown on the smartphone 106 may display a video stream 312a and a video stream 312b. The video stream 312a may correspond with the video stream generated by the image sensor 234a. The video stream 312b may correspond with the video stream generated by the image sensor 234b. For example, the device 102 may be configured to wirelessly communicate (e.g., a live stream and/or a recorded file for later playback) the video streams to the smartphone 106 using the communication device 216. The companion application 310 may playback the video streams 312a-312b.

In the example shown, the companion application 310 may further comprise controls 314. The controls 314 may enable access to various features of the companion application 310. In one example, the controls 314 may be a play/pause video progress bar (e.g., used to control what portion of the video streams 312a-312b the user 50 is viewing). In another example, the controls 314 may be a live view indicator (e.g., to indicate whether the video streams 312a-312b are live video currently captured by the device 102 or a pre-recorded file). In yet another example, the controls 314 may be a toggle button to toggle between options (e.g., enable/disable a live view). In another example, the controls 314 may be a button configured to activate/deactivate audio communication (e.g., one-way audio by the user 50 to be played back by the device 102 and/or a two-way intercom to additionally receive audio from the device 102). In still another example, the controls 314 may be a button to access other features of the smartphone 106 (e.g., an app-drawer). In another example, the controls 314 may be a button configured to control a light that may be coupled with the device 102. The features and/or controls 314 implemented by the companion application 310 may be varied according to the design criteria of a particular implementation.

In the example shown, the companion application 310 operating on the smartphone 106 may show a dual view displaying both video streams 312a-312b. In some embodiments, the companion application 310 may display one of the video streams 312a-312b at a time or neither of the video streams 312a-312b. The dual view may comprise the front view video stream 312a corresponding to the field of view 170 captured by the front facing lens 232. The dual view may comprise the bottom view video stream 312b corresponding to the field of view 172a-172b captured by the bottom lens 152.

The video streams 312a-312b shown may be captured by the image sensors 234a-234b from the doorbell embodiment of the apparatus 100. In the example shown, the video stream 312a may comprise a view captured by the front-facing capture device 234a. For example, in a doorbell embodiment, the device 102 may be mounted to a surface at approximately 48 inches from the ground (e.g., a standard doorbell height). The video stream 312*a* may capture a view of a visitor 320 from the height of a doorbell. In the example shown, the field of view 170 for the video stream 312*a* may capture a waist, torso, chest and face of the visitor 320.

For the doorbell embodiment of the device 102, the video stream 312*b* may comprise a view captured by the bottom capture device 234*b*. The bottom capture device 234*b* may capture an area below the device 102. In the example shown, the video stream 312*b* may comprise a high angle view of the bottom (e.g., from the waist down) of the visitor 320. The video stream 312*b* may further comprise a view of a package 330. For example, the field of view 172*a*-172*b* for the bottom view video stream 312*b* may be oriented to capture packages 330 left at the premises. A tracking number 332 is shown on the package 330. A portion of a welcome mat 334 is also visible in the example shown.

The video processor 214 may be configured to scan the tracking number 332. For example, the image quality of the capture device 234*b* may be high enough to enable the video processor 214 to read various tracking numbers (e.g., bar codes, numbers, QR codes, etc.). The video processor 214 may read and/or decipher the tracking number 332 using optical character recognition and/or object detection. In some embodiments, the wireless communication device 216 may be configured to send a notification using the companion application 310 to indicate that the package 330 with the tracking number 332 read by the video processor 214 has been delivered. In some embodiments, the user 50 may use the companion application 310 to input and store particular tracking numbers of expected packages, and the video processor 214 may compare the detected tracking number 332 against the stored tracking numbers.

In an example, the video streams 312*a*-312*b* may be played back simultaneously. For example, the front view video stream 312*a* may show a view of the face of a visitor 320 and the bottom view 312*b* may show the waist down view of the visitor 320 and the package 330 at the same time. For example, if the visitor 320 is a burglar stealing the package 330, the front view video 312*a* may provide a clear view of the face (e.g., identity) of the visitor 320 but not the package 330 and the bottom view video 312*b* may show the visitor 320 stealing the package 330 but not provide a view of the face to identify the thief. Similarly, if the visitor 320 is attempting to break into the home by opening the door, the front view video 312*a* may not provide the view of the door but the bottom view video 312*b* may show the visitor 320 attempting to open the door. The videos 312*a*-312*b* captured by both the front capture device 234*a* and the bottom capture device 234*b* may be used as evidence for police of the visitor 320 trying to steal the package 330 and/or attempting to break into the premises.

In some embodiments, the device 102 may be configured to send notifications to the companion application 310 in response to the detection and/or authentication. For example, a text message and/or an email may be transmitted in response to the notification. In another example, a notification may be sent via an API (e.g., push notifications) for a particular operating system (e.g., Android notifications, iOS notifications, Windows notifications, etc.). Generally, the user 50 may create a user account (e.g., comprising at least an email address and a password as credentials) for the cloud service 104 (e.g., via an app and/or a web-based interface). The user account may allow the user 50 to configure preferences. The preferences may comprise the notification settings. The type of notifications sent by the device 102 may be based on the notification settings. In an example, the notification may provide an indication of when the package 330 has been delivered.

The video output streams 312*a*-312*n* may be configured to capture the head to toe view of the visitor 320. For example, the FOV 170 and the FOV 172*a*-172*b* of the device 102 may be configured to provide a view of the full height of a person. Since two FOVs are used from two different cameras, the two streams may not provide a continuous view of the person 320, but the view may appear to be somewhat continuous. In some embodiments, video operations may be performed on the video data from the dual camera sensors 234*a*-234*b* to modify (e.g., warp) the images to provide a continuous view of the person 320.

In an example, the top camera sensor 234*a* may provide 1080p HDR video data. The top camera sensor 234*a* may have a 30 ft range with night vision. The bottom camera sensor 234*b* may be configured to prevent blindspots. For example, the bottom camera sensor 234*b* may provide coverage for areas that are not covered by the top camera sensor 234*a* (e.g., to provide a full top to bottom view of a visitor). The bottom camera sensor 234*b* may implement a white LED night vision (e.g., using the lights 164*a*-164*b*). In a doorbell dualcam embodiment, a 110 dB+ siren may be implemented and a speaker for playing back the greetings and/or other audio.

In the example shown, the app 310 is used to access the dual video streams 312*a*-312*b*. The app 310 may be further configured to provide a premium plan with artificial intelligence (e.g., package monitoring and theft protection).

The video analysis may be configured to detect special events (e.g., interrupt events) such as a package delivery (e.g., at the door). The detection of a package delivery may initiate an alert state to prevent package theft. When the package is detected at the door, the current event may be overridden with the alert state (e.g., the default schedule may be interrupted by the alert state). A special greeting may be enabled during the package alert state.

The device 102 may be configured to perform automatic package detection using computer vision and/or AI technology. In some embodiments implementing the dualcam doorbell with the bottom camera sensor 234*b*, the package 330 may be detected when left on the ground at the front door (e.g., the package is in the FOV 172*a*-172*b* of the bottom camera sensor 234*b*). The camera FOV may be further adjusted by the user 50 to reduce false detection.

Figure 7:
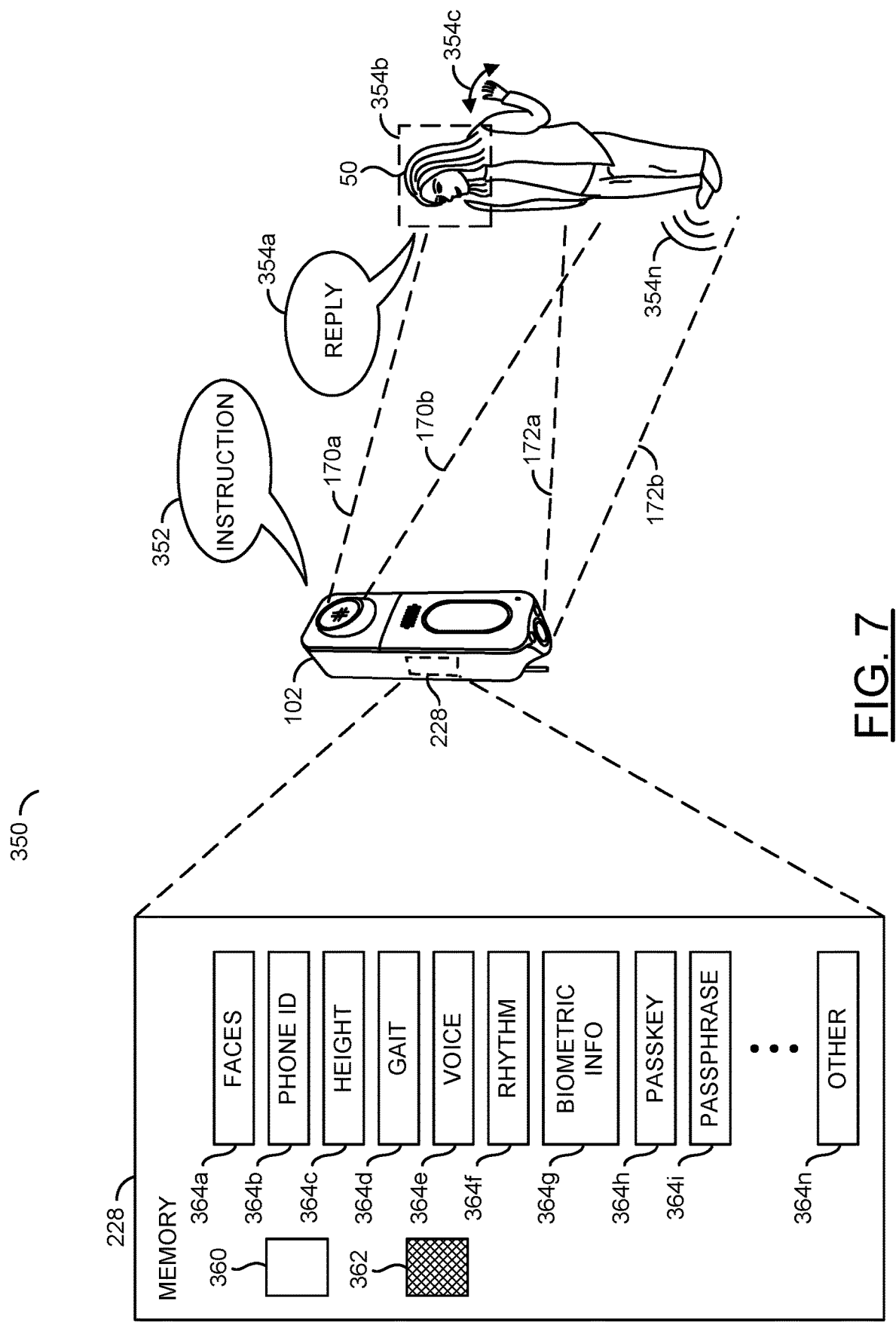
FIG. 7 is a diagram illustrating an example authentication.

Referring to FIG. 7, a diagram illustrating an example authentication is shown. An example scenario 350 is shown. The example scenario 350 may comprise the device 102 and the user 50. The memory 228 is shown in the device 102. A more detailed view of components of the memory 228 is shown as an expanded view. The FOV 170*a*-170*b* of the camera sensor 234*a* is shown. The FOV 172*a*-172*b* of the camera sensor 234*b* is shown. In the example scenario 350, the user 50 may be captured by the FOV 170*a*-170*b* and the FOV 172*a*-172*b*. A speech bubble 352 and a speech bubble 354*a* are shown. The speech bubble 352 may correspond to an audio instruction (e.g., an audio message) generated by the device 102. The speech bubble 354*a* may correspond to a vocal reply from the user 50.

Authentication characteristics 354*a*-354*n* are shown. The authentication characteristic 354*a* may correspond to the voice of the user 50. The authentication characteristic 354*b* may correspond to video analysis (e.g., facial recognition) of the user 50. The authentication characteristic 354*c* may correspond to a gesture performed by the user 50. In the example shown, the user 50 may be waving. The authentication characteristic 354n may correspond to audio generated by the user 50. In the example shown, the user 50 may generate audio by a foot tap. The device 102 may analyze other types of authentication characteristics. For example, the video analysis may be used to determine a height of the user 50. The authentication characteristics 354a-354n may be representative examples of some of the characteristics that the device 102 may detect and/or analyze.

The memory 228 is shown comprising a block (or circuit, or module) 360, a block (or circuit, or module) 362 and/or blocks (or circuits, or modules) 364a-364n. The block 360 may represent an approved list of users (e.g., a whitelist). The block 362 may represent a list of undesired users (e.g., a blacklist). The blocks 364a-364n may comprise various known values and/or factors for the users. In an example, each user on the whitelist 360 and each user on the blacklist 362 may have one or more associated stored values 364a-364n. Each user on the whitelist 360 or the blacklist 362 may not have every one of the stored values 364a-364n. The number and/or type of stored values 364a-364n associated with the users on the whitelist 360 or the users on the blacklist 362 may be varied according to the design criteria of a particular implementation.

The outdoor hub device 102 may be configured to determine a classification the user 50 as a person on the whitelist 360. Each user on the whitelist 360 may be approved for particular commands or groups of commands. For example, each user and/or category of user may have permission-based access to the functionality of the device 102 and/or the IP devices 120a-120n. In some embodiments, not every user on the whitelist 360 may have access to all of the functionality of the device 102 and/or the IP devices 120a-120n. In one example, the homeowner may be a user on the whitelist 360 that has full access to the functionality of the device 102 and/or the IP devices 120a-120n (e.g., full permissions). In another example, a child of the homeowner may be a user on the whitelist 360 that has permission to unlock a door but may not have permission to initiate the irrigation system (e.g., partial permissions). Each person on the whitelist 360 may have a certain level of access to doors, outdoor devices to control (e.g., lights, music, greetings, etc.), phone numbers to call/text, etc.

The outdoor hub device 102 may be configured to determine a classification the user 50 as a person on the blacklist list 362. Each user on the blacklist 362 may be denied permission for every command. When a user on the blacklist 362 is detected, one or more of the commands may be automatically initiated by the device 102. For example, users on the blacklist 362 may be a known criminal, a solicitor, a pest animal, etc. In one example, if a criminal is detected, the device 102 may automatically initiate a command to have one of the IP devices 120a-120n sound an alarm, and the device 102 may contact the authorities. In another example, if a solicitor is detected the device 102 may playback an audio message of, "Please do not disturb this household".

In some embodiments, users on the whitelist 360 and/or users on the blacklist 362 may not refer to specific individuals. The users on the whitelist 360 and/or the users on the blacklist 362 may comprise groups and/or categories of users. In one example, a group of users on the whitelist 360 may be each member of the household. In another example, a group of users on the whitelist 360 may be a person detected as a delivery person (e.g., determined based on a uniform). In yet another example, a group of users on the blacklist 362 may be people exhibiting the behavior of a burglar (e.g., jiggling doorknobs, checking windows, attempting to enter multiple entrances, etc.). The types of people and/or groups of people on the whitelist 360 and/or the blacklist 362 may be varied according to the design criteria of a particular implementation.

The stored values 364a-364n may comprise passive characteristics and/or active characteristics. The passive characteristics may comprise the detection of authentication characteristics that are performed on the visitor 50 without a specific action by the visitor 50. In an example, the video analysis used for facial recognition may be a passive authentication characteristic. The active characteristics may comprise authentication characteristics that are detected in response to an action by the visitor 50. In an example, the device 102 may ask the visitor for a passphrase and the active authentication characteristic may be the audio analysis of the passphrase. The types of passive and/or active detection performed may be varied according to the design criteria of a particular implementation.

The stored values 364a may correspond to faces (e.g., 2D face detection and/or 3D face detection detecting based on analyzing video frames of the visitor 50 approaching the device 102). The stored values 364b may be a phone ID (e.g., determined based on using a Bluetooth MAC address from the smartphone 124 detected by the communication device 216). The stored values 364c may correspond to a visitor height (e.g., an estimate of the height may be determined by triangulation using at least 2 cameras). The stored values 364d may correspond to a gait of the visitor 50 (e.g., performing video analysis on how the visitor 50 walks when approaching the device 102, performing audio analysis on the sound of the footsteps approaching the device 102, etc.). The stored values 364a-364d may correspond to passive detection.

The stored values 364e may correspond to a voice of the visitor 50 (e.g., using the microphone 224, the device 102 may use artificial intelligence to start a conversation with the visitor 50 and device 102 may analyze the voice format). The stored values 364f may correspond to a rhythm performed by the visitor 50 (e.g., the visitor 50 may be requested to tap a rhythm of a pre-selected favorite song near the microphone 224). The stored values 364e-364f may correspond to active detection.

The stored values 364g may correspond to biometric information of the visitor 50 (e.g., measuring a body part such as a palm, or finger size when the visitor 50 is asked to hold up a hand to the camera, measuring a quick wave while walking in, etc.). The stored values 364h may correspond to a passkey (e.g., show barcode/QR code from a package, a RFID wallet card, a code displayed on a phone app screen, etc.). The stored values 364i may correspond to a passphrase (e.g., the visitor 50 speaks one or more pre-approved key words).

Other types of stored values 364n may be implemented. In one example, the device 102 and/or the IP devices 120a-120n may detect vehicle sounds (e.g., diesel engine from a UPS/FedEx delivery vehicle, a car door slam, etc.). In another example, the device 102 may analyze the seashell effect volume estimate. In yet another example, the device 102 may request an automated challenge response (e.g., spoken letters/numbers/phrases, analyzing a reply to a challenge phrase based on a known code cipher (e.g., respond with the 6th letter of 1st word, 3rd letter of 2nd word, 2nd letter of 3rd word, etc.). In still another example, the device 102 may make a Bluetooth or WiFi direct connection to the app 310 and initiate the app 310 to playback a sound in response to a sound emitted from the speaker 220 and/or initiate the app 310 to modulate a brightness from the phone screen 302 (e.g., or cause the camera flash LED to illuminate, which could work at long distances).

In the example scenario 350, the visitor 50 may approach the device 102 (e.g., walk up to the front door). In the example shown, the detection of the authentication characteristics 354a-354n may be performed by the device 102. However, the detection of the authentication characteristics 354a-354n may be performed by the device 102 and/or the IP devices 120a-120n. As the visitor 50 approaches, the FOV 170a-170b and the FOV 172a-172n may capture the visitor 50. The gait may be analyzed using video analytics and compared to the stored values 364d. The face 354b may be detected using facial recognition analysis and compared to the stored values 364a. The FOV 170a-170b may capture a top portion of the visitor 50 and the FOV 172a-172b may capture a bottom portion of the visitor 50. The device 102 may combine the top portion and bottom portion of the visitor 50 to generate a head-to-toe video capture of the visitor 50 and estimate the height in order to compare to the stored values 364c. For example, the device 102 may compensate for the difference (e.g., location, angle, resolution, etc.) between the image sensors 234a-234b in order to recreate a full head-to-toe estimate of the visitor 50 from two separate and partial views of the visitor 50.

Continuing the example, when the visitor 50 arrives within a pre-determined range and/or area of the device 102, the device 102 may provide the instructions 352 to request information for further authentication. The user 50 may provide the vocal reply 354a. The vocal reply 354a may be analyzed to determine a vocal format/pattern and compared to the stored values 364e. In another example, the instructions 352 may request a passphrase and the vocal reply 354a may be analyzed for keywords to compare to the passphrase of the stored values 364i. The instructions 352 may further request that the visitor 50 perform a specific gesture (e.g., a wave). The visitor 50 may perform the gesture 354c. For example, the device 102 may analyze the gesture 354c to compare to the biometric information in the stored values 364g (e.g., the wave may provide a view of the palm of the hand to perform a hand measurement, the wave may be analyzed as a specific gesture to use as a form of password, etc.). The instructions 352 may request that the visitor 50 perform a specific rhythm (e.g., a beat of a particular song) and the device 102 may analyze the foot tapping 354n to compare to the stored values 364f. A comparison of the detected authentication characteristics 354a-354n and the stored values 364a-364n may comprise the first authentication and/or other authentication factors that may adjust the confidence level of the identification and/or classification of the user 50.

The device 102 may perform sensor fusion operations to analyze a progressive number of authentication steps and/or factors until a threshold of the confidence level is achieved for authentication (e.g., 99% certainty). The authentication steps may be analyzed independently and/or in aggregate (e.g., sensor fusion). Similarly, the authentication steps and/or factors may be used to determine that the visitor 50 is not on the whitelist 360 or the blacklist 362. In an example, the sensor fusion may be used to implement two-factor authentication and/or multi-factor authentication. The device 102 may stop performing the authentication steps when a high enough confidence level is achieved to determine that the visitor 50 is a match or is not a match to the whitelist 360 or the blacklist 362.

The instructions 352 may combine a greeting with a request for information. For example, the instructions 352 may be, "Good morning, may I have your name? And how can I help you?" The reply 354a may be analyzed for a specific name as the passphrase 364i. In another example, the instructions 352 may combine other audio such as a camera shutter sound with the audio recording, "my boss would like to call you back, what is your phone number?" The camera shutter sound may be used to deter a potential criminal as well as the request for personal contact information. In yet another example, the instructions 352 may inform the visitor 50 that personal information has been received such as, "Good evening, I see your cell phone MAC address. How are you?" The declaration that information has been collected may further deter a potential criminal. In still another example, the instructions 352 may provide context-aware intelligent conversation such as "It is 1 am and 40 degrees cold here, how can I help you?" The conversational AI may prompt the visitor 50 to respond in order to perform voice analysis and/or receive commands.

In some embodiments, the device 102 may automatically perform a command based on the detected behavior of the visitor 50. If the visitor 50 is not detected as a person on the whitelist 360 or the blacklist 362 (e.g., an unknown visitor), the behavior may be analyzed for particular patterns. In one example, after a pre-determined amount of time of detecting the same person the device 102 may conclude that the visitor 50 is loitering and play a sound such as an alarm. In another example, if the visitor 50 is loitering at a suspicious time of the day then a camera sound may be played, the police may be contacted and/or a police siren may be played back to scare away the loiterer/potential criminal.

The device 102 may be used to authenticate people on the whitelist 360 such as domestic helpers. For example, the visitor 50 may be a domestic helper that has to use 2-part authentication for access to the premises. The device 102 may perform the facial analysis 354b and/or the vocal analysis 354a. Then the domestic helper may need to use the keypad of a door lock to unlock the door. The lock may be wirelessly controlled by the device 102 but connected to the Internet 60. The two factor authentication may provide extra security by preventing the domestic helper from allowing others to gain access by simply giving out the keypad code. Furthermore, the domestic helper knows there is video recording for additional security. The domestic helper may be an example of a category of a person on the whitelist 360 that has partial permissions (e.g., the domestic helper 360 may have permission to unlock the door, but may not have permission to enter the garage).

Figure 8:
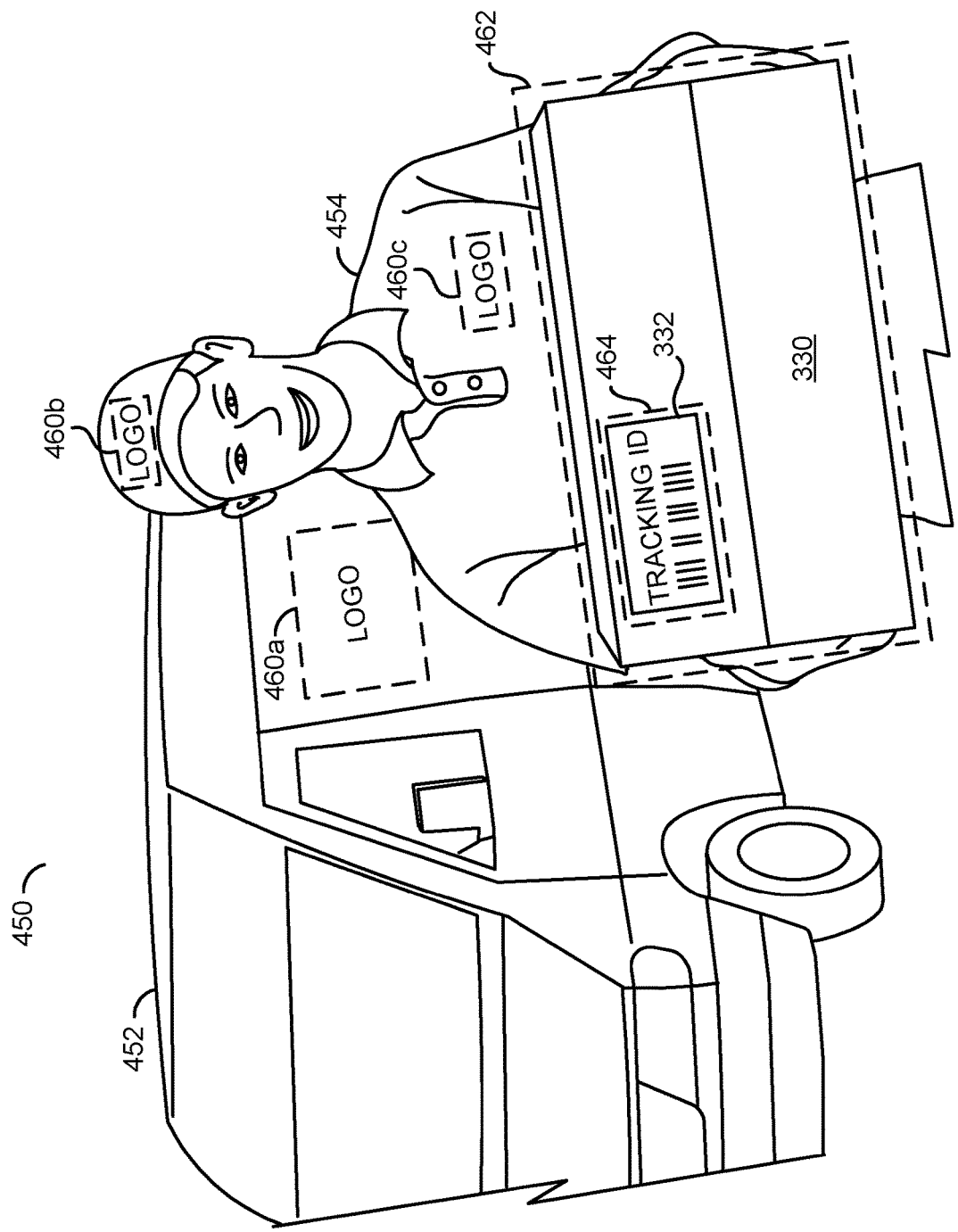
FIG. 8 is a diagram illustrating an example of video analysis detecting a package delivery in a video frame.

Referring to FIG. 8, a diagram illustrating an example of video analysis detecting a package delivery in a video frame is shown. The example video frame 450 may correspond to one of the video frames captured by the front capture device 234a (e.g., via the front lens 232).

Generally, the video frames captured by the front-facing capture device 234a may be used by the device 102 to determine whether the package 330 is being delivered. For example, the field of view 170 may be directed to a location that would capture visitors approaching the premises. The bottom capture device 234b may also be used to determine whether the package 330 is being delivered. For example, the bottom capture device 234b may be used to detect the package 330 being placed in a particular location by a delivery person. Both sets of video frames may be used to determine whether the package 330 is being delivered. However, the video data captured by the front-facing capture device 234a may be more likely to detect events corresponding to the package delivery before the bottom-facing capture device 234b.

The example video frame 450 may comprise a delivery truck 452 and a delivery person 454. In the example video frame 450, the delivery person 454 is shown carrying the package 330. For example, the front-facing capture device 234a may capture images of the delivery person 454 approaching the premises. For example, the video frames may capture a sequence of events corresponding to the delivery truck 452 approaching and parking near the premises 402a, the delivery person 454 getting out of the truck 452 and retrieving the package 330 from the truck 452 and then carrying the package 330 up to the access point 404a (e.g., the front door). The video processor 214 may be configured to intelligently analyze the video frames to determine the behavior of the visitor (e.g., the delivery person 454) and come to the conclusion that the behavior is consistent with a package delivery behavior. Sensor fusion may be implemented for further authentication (e.g., detecting a diesel sound of the truck 452, audio of the delivery person 454 announcing themselves, etc.).

A logo 460a is shown on a side of the truck 452. A logo 460b is shown on the hat worn by the delivery person 454. A logo 460c is shown on the uniform (e.g., on the chest) of the delivery person 454. The video processor 214 may be configured to perform video analysis to determine the characteristics of the delivery truck 452 and/or the delivery person 454. For example, the detected logos 460a-460c may be used by the video processor 214 to determine that the visitor 454 is a delivery person. Additionally, the detected logos 460a-460c may be used by the video processor 214 to determine which package is being delivered. For example, multiple packages may be delivered by different parcel services (e.g., different services may have different logos).

An object 462 may be detected as the package 330. For example, the video processor 214 may be configured to distinguish between various types of objects. For example, the object 462 may be determined to have a rectangular shape (e.g., a common shape for a package), and a brown color (e.g., a common color of boxes that are shipped). The characteristics of the object 462 (e.g., size, shape, color, markings, etc.) detected by the video processor 214 may be used to determine that the object 462 is the package 330.

An object 464 may be detected as the tracking ID (or shipping label) 332. The tracking ID 332 may be used by the video processor 214 to correlate the package 330 with a particular expected delivery. In some embodiments, the companion application 310 may provide an API to enable the homeowner to input expected package deliveries to monitor. In some embodiments, the companion application 310 may provide an API to enable automatically scraping data from various delivery services to determine expected package deliveries. For example, the tracking ID 332 may be used to distinguish between multiple deliveries. In another example, markings on the package 330 may be used to distinguish between multiple deliveries. For example, particular merchants have stylized boxes for deliveries (e.g., an Amazon shipment has the Amazon logo on the box), which may be recognized by the video processor 214 to help distinguish between deliveries.

The video processor 214 may be configured to detect the delivery of the package 330 as early as possible (e.g., as the delivery person 454 is approaching the premises). Using artificial intelligence and/or machine learning to detect objects, the delivery person 454 may be detected by uniform, by having a package in hand, etc. Accuracy may be improved by knowing the expected time of delivery. For example, an expected time of delivery may be input by the homeowner and/or may be provided by shipment tracking provided by various parcel carriers and/or provided by various merchants (e.g., Amazon, Jet.com, Costco.com, etc.). For example, the companion application 310 and/or the cloud services 410 may be configured to read information from the various shipment tracking sources and determine an expected time of delivery. For example, the device 102 may be awoken from a sleep state several minutes before the package 330 is scheduled for delivery. In another example, the delivery person 454 may scan the next package to deliver and send the signal to the cloud services 410.

In some embodiments, the device 102 may perform sensor fusion operations to determine whether the package 330 is being delivered. For example, the sensor fusion operations may combine various data inputs (e.g., from the signals SEN_A-SEN_N) in order to make inferences about what is happening that would not be able to be determined from one data source alone. For example, the sensor fusion operations may combine the data generated in response to the video analysis by the video processor 214 (e.g., the facial recognition, detecting the package 330, detecting the logos 460a-460c, etc.). In another example, the sensor fusion operations may combine the data about the tracking information received via the companion application 310 (e.g., the expected time of delivery, the parcel service, the weight/size of the package 330, etc.). Other information may be combined such as voice recognition implemented by the audio processing component 222. In some embodiments, the sensor fusion operations may combine fingerprint information generated by the fingerprint scanner 226. For example, the pre-recorded audio instructions generated by the device 102 may instruct the delivery person 454 to touch the button 136 so that the fingerprint may be scanned. The combination of computer vision data, fingerprint data, tracking information data, behavior analysis, voice recognition and/or information from other sensors may increase a confidence level of the determination that the package 330 is being delivered.

When the video processor 214 determines that the behavior and/or characteristics of the visitor 454 indicates that a package is being delivered, the device 102 may generate one or more control signals to activate various responses. The control signals may be configured to control the various components of the device 102 (e.g., the speaker 220, the microphone 224, the lights 140a-140b, etc.) and/or the IP devices 120a-120n. The various components of the device 102 and/or the IP devices 120a-120n may perform the response(s) based on the control signals (e.g., CMD_A-CMD_N) received.

In one example, one of the responses may be to use the speaker 220 to emit a pre-recorded message to ask the delivery person 454 to place the package 330 in a particular (e.g., hidden) location. For example, the pre-recorded message may be "Hello. Thank you for delivering the package. Please bring the package to the side door". In another example, the message may be, "The garage door is slightly opened, please slide the package under the door." Other messages may provide instructions such as to place the package in a bush that hides the package from a view from the street.

In another example, the pre-recorded message may provide instructions to place the package 330 in a particular area. When the package is placed in the field of view of the bottom capture device 234b, the device 102 may be able to monitor the package 330. In an example, the tracking ID 332 may be scanned using the bottom capture device 234b (e.g., read the barcode) and the response may be to send a delivery confirmation to the user devices 106a-106n via the companion application 310.

When the device 102 detects someone with a package (e.g., the delivery person 454 carrying the detected package 462), the device 102 may playback the instructions 352. For example, the instructions may state, "Please face the barcode of the package at the bottom camera to scan". If the delivery person 454 faces the tracking ID barcode 332 in the FOV 172a-172b of the camera 152, then the device 102 may perform the detection 464. The device 102a-102n may generate one of the command signals CMD_A-CMD_N to one of the IP devices 120a-120n configured to activate the garage door. For example, the command may instruct the garage door IP device 120a-120n to open about 1 foot high. After issuing the command to open the garage door, the device 102 may provide another instruction 352. For example, the device 102 may playback audio that states, "Please put the package inside the garage". After the device 102 detects that the package 330 has been placed in the garage and the delivery person 454 is outside of the garage, the device 102 may issue another one of the commands CMD_A-CMD_N to the IP devices 120a-120n to close the garage door.

Figure 9:
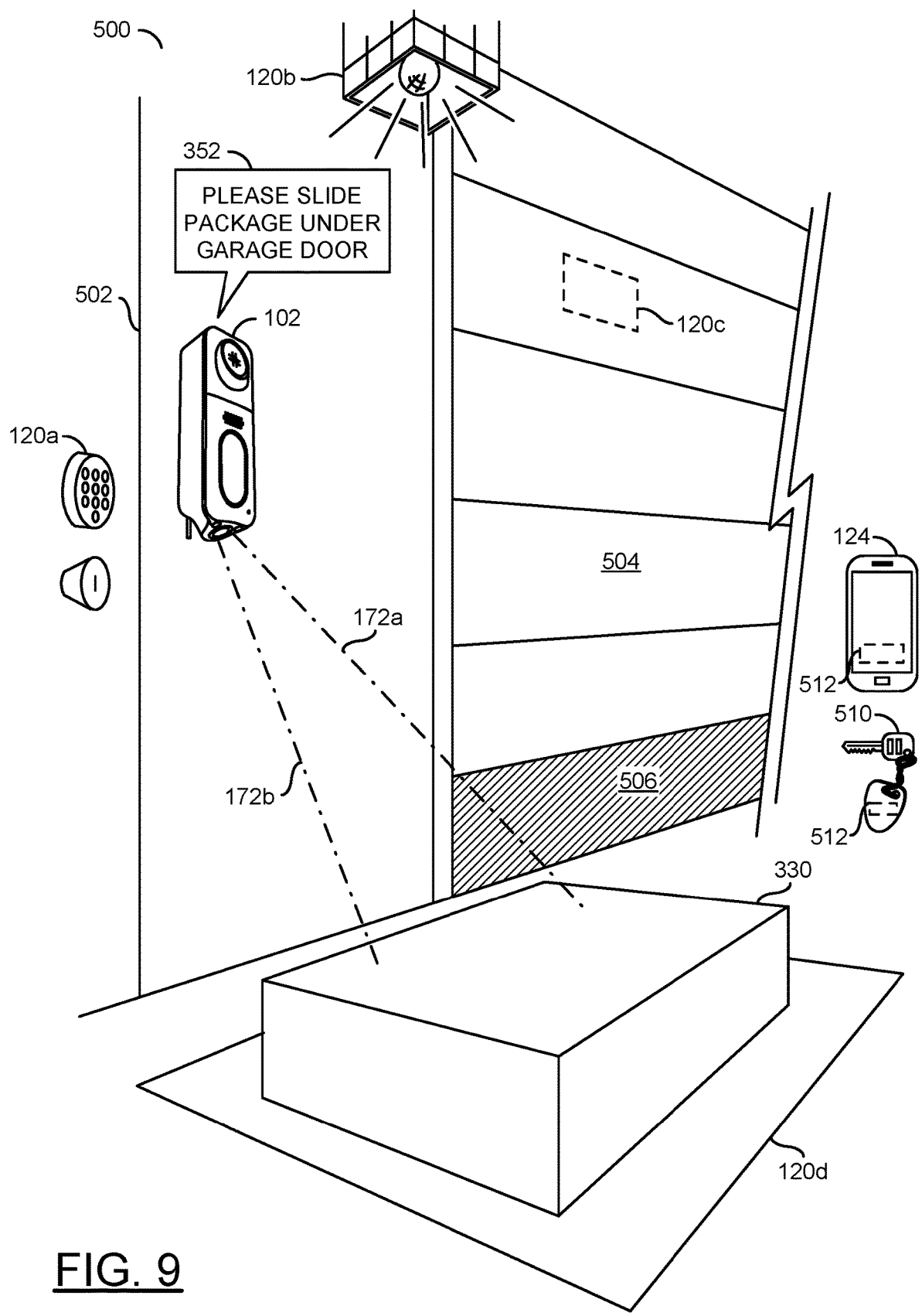
FIG. 9 is a diagram illustrating the outdoor hub controlling multiple remote devices.

Referring to FIG. 9, a diagram illustrating the outdoor hub controlling multiple remote devices is shown. An example delivery scenario 500 is shown. The device 102 is shown wall mounted next to a door 502 (e.g., a front door) and a garage door 504. The device 102 may operate as the outdoor hub and/or a doorbell. In the example delivery scenario 500, the garage door 504 is shown partially open with a gap 506 between the garage door 504 and the ground.

IP devices 120a-120d are shown. In the example delivery scenario 500, the IP device 120a may implement a keypad door lock, the IP device 120b may implement a smart light, the IP device 120c may implement a garage door opener and the IP device 120d may implement a pressure sensor. Each of the IP devices 120a-120d may be connected wirelessly to the outdoor hub device 102.

The package 330 is shown located on the ground on top of the pressure sensor 120d. The package 330 is shown in the field of view 172a-172b of the bottom camera 152 of the outdoor hub device 102. In an example, analysis of the video frames captured by the bottom camera 152 may detect the presence of the package 330 in the FOV 172a-172b. In another example, the pressure sensor 120d may provide the signal SEND indicating that weight has been added to the pressure sensor 120d. The processor 214 may be configured to perform sensor fusion operations to combine the information from the signal SEN_D (e.g., the presence of weight) and the video analysis detection of the package 330 to make an inference that a package is present. In some embodiments, the video analysis detection of the package 330 may be sufficient for the processor 214 to determine that a package is present.

In response to the package detection, the outdoor hub device 102 may initiate one or more commands. The speech bubble 352 is shown. The instructions of the speech bubble 352 may state, "Please slide the package under the garage door". The outdoor hub device 102 may further generate the command signal CMD_C to the garage door opener IP device 120c. The command signal CMD_C may provide instructions to the IP device 120c to open the garage door 504 a small amount to create the gap 506. In one example, the video analysis may determine a height of the package 330 and the instructions in the command CMD_C may indicate how high to make the gap 506 (e.g., large enough for the package 330, but keep the gap 506 as small as needed for the package 330 to create difficulty for a potential intruder. The video analysis may be performed to detect whether the delivery person has placed the package 330 into the garage door through the gap 506. After the package 330 has been placed in the garage (and the delivery person is no longer close to the garage door), the outdoor hub device 102 may provide another command signal CMD_C to the garage door IP device 120c with instructions to close the garage door 504 so that the gap 506 is no longer available.

In another example, in response to the package detection, the outdoor hub device 102 may send the command signal CMD_A to the door lock IP device 120a. For example, the wireless control of the door lock IP device 120a by the outdoor hub device 102 may enable the door 502 to be unlocked in response to the detection of the package 330 by the camera 152. The instructions 352 may playback audio stating, "Please open the door and place the package inside". After the video analysis performed by the outdoor hub device 102 determines that the package 330 has been delivered inside the door 502 and the delivery person is outside again, the outdoor hub device 102 may send another command signal CMD_A to instruct the door lock IP device 120a to lock the door 502.

In yet another example, in response to the package detection, the outdoor hub device 102 may send the command signal CMD_B to the smart light IP device 102b. For example, the wireless control of the smart light IP device 120b by the outdoor hub 102 may enable the area near the package 330 to be illuminated. For example, if the door lock IP device 120a and the garage door IP device 120c are unavailable, then the outdoor hub device 102 may decide that the next best option is to provide illumination for the package 330 (e.g., since thieves may avoid well-lit areas and/or to provide better lighting for the cameras 234a-234b to capture video of package thieves).

The outdoor hub device 102 may be configured to intelligently determine which commands to automatically initiate in response to the detected scenario. Which commands to select may be determined based on the detected scenario, available functionality (e.g., which functionality is available from the IP devices 120a-120n) and/or available battery life for the IP devices 120a-120n. For example, the signals SEN_A-SEN_N may provide a battery life measurement to the outdoor hub device 102.

For the example of the package delivery scenario 500, the device 102 may decide that the preferred option is to use the garage door IP device 120c to open the garage door 504 for the package 330 (e.g., does not provide full access to the home, the small gap 506 may prevent unauthorized access to the home, etc.). If the garage door IP device 120c is unavailable (e.g., not installed, unable to communicate, low battery, etc.), then the outdoor hub device 102 may decide that the next preferred option is to open the door 502 using the door lock IP device 120a (e.g., provides greater access to the home than the garage door, but still secures the package 330). If both the garage door IP device 120c and the door lock IP device 120a are unavailable, then the outdoor hub device 102 may decide that the next preferred option is to use the smart light IP device 120b to illuminate the area near the package 330 (e.g., package is easily accessed by potential thieves, but the light may deter theft attempts). The user 50 (if authorized to have permission based on the authentication and the whitelist 360) may override the automatic command selection by the outdoor hub device 102 using the voice command 122.

The automatic selection of the commands performed by the outdoor hub device 102 may change based on the scenario. For example, for a package delivery, the command CMD_C for the garage door IP device 120c may be preferred over the command CMD_A for the door lock IP device 120*a* and/or the command CMD_B for the smart light IP device 120*b*. However, if the video analysis determines that the visitor 50 carrying the package 330 is not a delivery person, but is instead the homeowner on the whitelist 360 bringing the package home then the outdoor hub device 102 may adjust the preference for the commands. For example, for the homeowner carrying the package 330, the outdoor hub device 102 may issue the command CMD_A to instruct the door lock IP device 120*a* to open the door 502 (e.g., for easier access to the home while carrying the package 330), instead of the command CMD_C for the garage door IP device 120*b*.

In some embodiments, the outdoor hub device 102 may provide communication with a central monitoring service (e.g., a third-party security alarm monitoring service, police, etc.). The verbal authentication performed by the outdoor hub device 102 may be configured to prevent unintentional calls to the central monitoring service. For example, if the central monitoring service feature is in an armed state (e.g., configured to contact the central monitoring service), then the outdoor hub device 102 may provide a number of escalating queries and/or voice challenges. In one example, the outdoor hub device 102 may greet the visitor 50 and state that the police will be notified unless the system is disarmed and prompt the visitor 50 to provide a passcode and/or perform facial recognition analysis. One or more pre-recorded messages may be played back to the visitor 50 for authentication to enable automated authentication before an employee of the central monitoring service is contacted (e.g., which may result in fees).

In some embodiments, a unique identifier associated with a wireless device (e.g., a wireless device carried by the visitor 50 and/or in the possession of the visitor 50) may be one of the authentication characteristics 354*a*-354*n*. In the example scenario 500, the smartphone 124 and a key fob 510 are shown. The smartphone 124 and/or the key fob 510 are shown comprising a block (or circuit, or module) 512. The block 512 may be the unique identifier.

The unique identifier 512 of the wireless device may be used as the first authentication and/or one of the authentication factors. In one example, the wireless device providing one of the unique identifier 512 as one of the authentication characteristics 354*a*-354*n* may be the smartphone 124 (or one of the user devices 106*a*-106*n*) shown in association with FIG. 2. For example, the unique identifier 512 associated with the smartphone 124 (e.g., a MAC address, an electronic certificate, an automatically expiring electronic token, a randomly generated access code, a Bluetooth signal, etc.) may be one of the authentication characteristics 354*a*-354*n*. In another example, the wireless device providing the unique identifier 512 as one of the authentication characteristics 354*a*-354*n* may be the fob device 510 (e.g., a key fob). For example, the unique identifier 512 associated with the fob device 510 (e.g., a MAC address, an electronic certificate, an automatically expiring electronic token, a randomly generated access code, a Bluetooth signal, etc.) may be one of the authentication characteristics 354*a*-354*n*.

The door lock IP device 120*a* may be configured to lock/unlock and/or control the door 502. The door lock IP device 120*a* may be a battery-powered device. The battery-powered door lock IP device 120*a* may not be able to reliably perform authentication of the user 50 without a wired power source (e.g., the artificial intelligence-based authentication steps performed by the outdoor hub device 102 may be power consuming operations that may quickly drain batteries). Furthermore, a battery-powered device may not be always on and/or may introduce latency.

The outdoor wireless hub device 102 may be configured to perform the authentication of the user 50 and generate the command signal CMD_A to the door lock IP device 120*a*. For example, the outdoor wireless hub device 102 may have the wired power supply to analyze the authentication factors 354*a*-354*n* to perform the authentication of the user 50. For example, the outdoor wireless hub device 102 may receive the unique identifier 512 from the smartphone 124 and/or the fob device as one of the authentication factors 354*a*-354*n* and perform the comparison to the stored values 364*a*-364*n* (e.g., the phone ID stored value 364*b*) to classify the visitor 50 (e.g., determine whether the visitor 50 is on the approved list of users). If the confidence level of the classification of the user is high enough, then the outdoor wireless hub device 102 may generate the signal CMD_A to the door lock IP device 120*a*. The door lock IP device 120*a* may unlock and/or open the door 502 in response to the signal CMD_A.

In some embodiments, the unique phone/fob identifier 512 may be the first authentication and/or may provide a sufficient confidence level to classify the visitor 50 as an authenticated user. For example, the unique identifier 512 may adjust the confidence level above the pre-determined threshold without performing the analysis of the audio input (e.g., the unique identifier 512 may further comprise a pre-set command readable by the outdoor hub device 102 for opening the door 502 using the door lock IP device 120*a*). In some embodiments, the voice authentication may be the first authentication and/or may provide a sufficient confidence level to classify the visitor 50 as an authentication user. In some embodiments, the outdoor wireless hub device 102 may use a combination of the unique phone/fob identifier 512, the voice authentication and/or other authentication factors to achieve a confidence level above the pre-determined threshold for classifying the visitor 50 as an authenticated user. The number and/or type of authentication factors analyzed may be varied according to the design criteria of a particular implementation.

Figure 10:
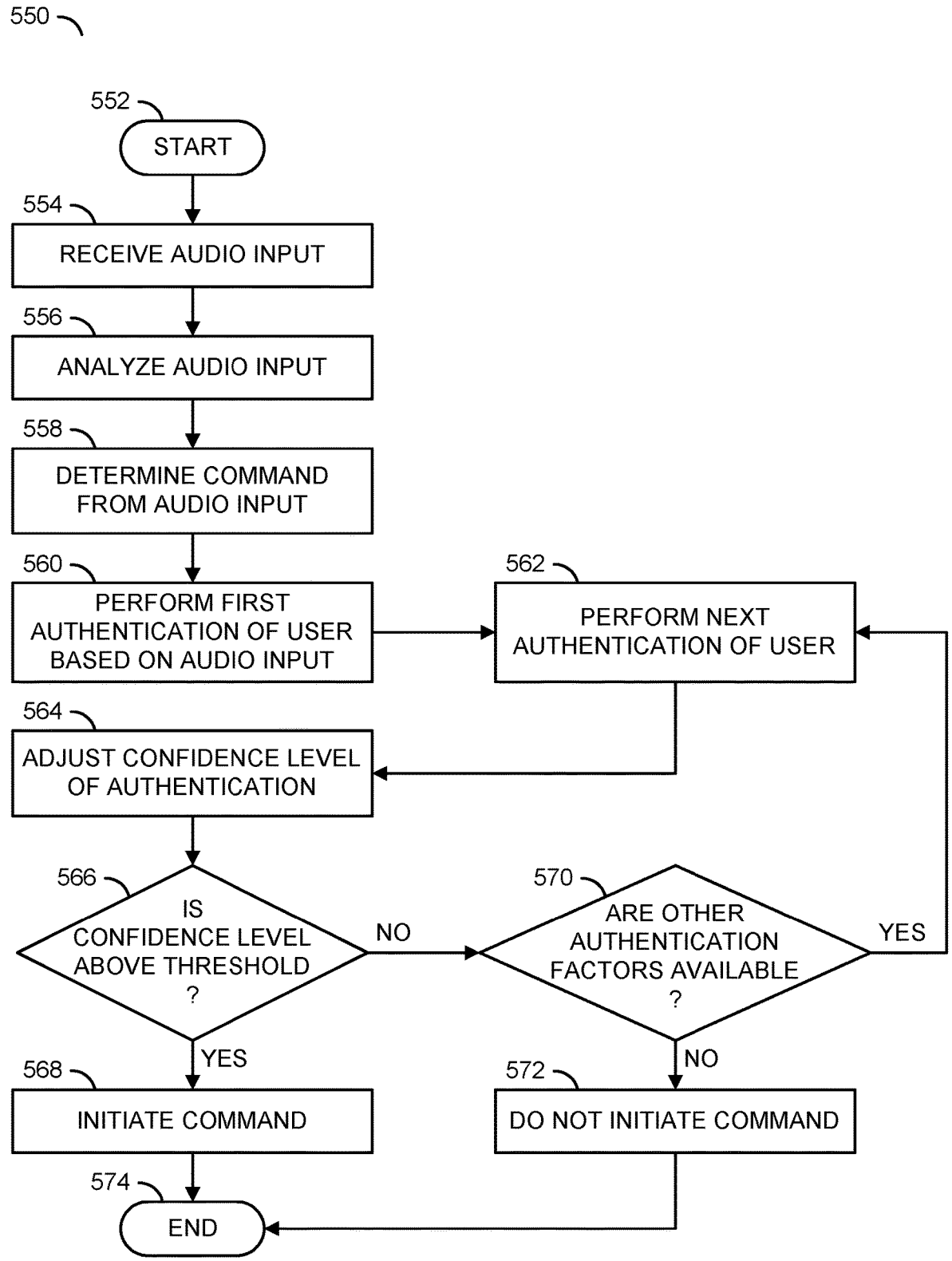
FIG. 10 is a flow diagram illustrating a method for authenticating a visitor.

Referring to FIG. 10, a method (or process) 550 is shown. The method 550 may authenticate a visitor. The method 550 generally comprises a step (or state) 552, a step (or state) 554, a step (or state) 556, a step (or state) 558, a step (or state) 560, a step (or state) 562, a step (or state) 564, a decision step (or state) 566, a step (or state) 568, a decision step (or state) 570, a step (or state) 572, and a step (or state) 574.

The step 552 may start the method 550. In the step 554, the device 102 may receive the audio input. In one example, the microphone 224 may capture the audio input. In another example, one of the IP devices 120*a*-120*n* may implement a microphone functionality and send the captured audio input as one of the signals SEN_A-SEN_N to the outdoor hub device 102. Next, in the step 556, the outdoor hub device 102 may analyze the audio input. For example, the processor 214 and/or the audio processor 222 may perform the analysis (e.g., voice extraction, voice frequency analysis, speech to text analysis, etc.). In the step 558, the processor 214 and/or the audio processor 222 may determine the command from the audio input. Next, the method 550 may move to the step 560.

In the step 560, the outdoor hub device 102 may perform the first authentication of the user 50 based on the analysis of the audio input. For example, the first authentication may be recognizing the voice of the user 50. Next, in the step 562, the outdoor hub device 102 may perform a next authentication of the user 50. For example, the next authentication may be based on the authentication factors AUTH_A-AUTH_N shown in association with FIG. 2. The next authentication may be one of the other authentication factors. In one example, the other authentication factors may be based on video analysis by the processor 214. In the step 564, the processor 214 may adjust the confidence level of the authentication (e.g., based on the first authentication and/or a combination of one or more of the other authentication factors). Next, the method 550 may move to the decision step 566.

In the decision step 566, the processor 214 may determine whether the confidence level is above the pre-determined threshold. If the confidence level is above the threshold, the method 550 may move to the step 568. In the step 568, the outdoor hub device 102 may initiate the command (e.g., determined in the step 558). The command may be performed by the outdoor hub device 102 and/or the signals CMD_A-CMD_N may be generated to cause one or more of the IP devices 120a-120n to perform the command. Next, the method 550 may move to the step 574. In the decision step 566, if the confidence level is not above the threshold, the method 550 may move to the decision step 570.

In the decision step 570, the processor 214 may determine whether other authentication factors are available. If there are more authentication factors available, the method 550 may return to the step 562. If there are not more authentication factors available, the method 550 may move to the step 572. In the step 572, the outdoor hub device 102 may not initiate or perform the command. Next, the method 550 may move to the step 574. The step 574 may end the method 550.

Figure 11:
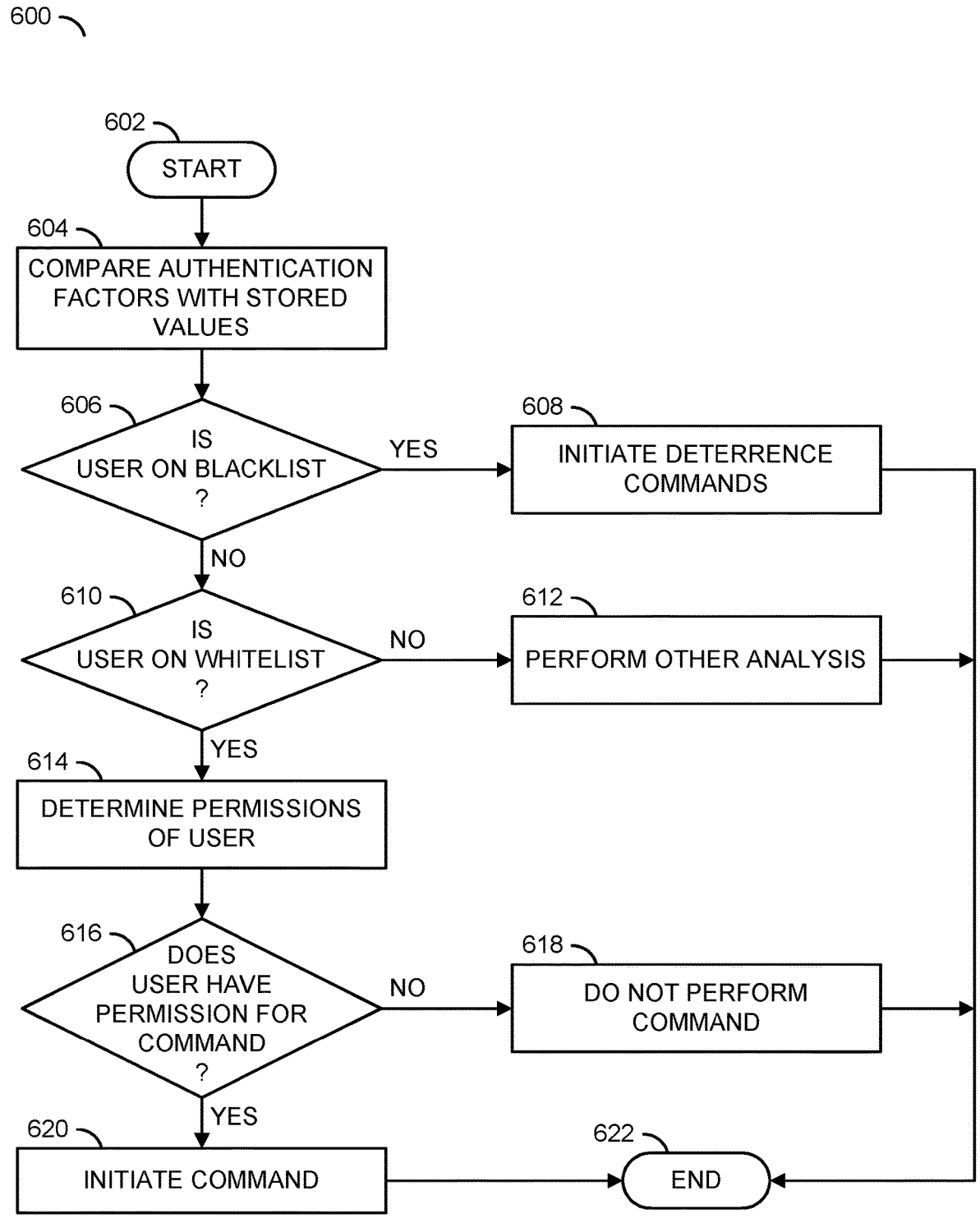
FIG. 11 is a flow diagram illustrating a method for determining permissions for a received command.

Referring to FIG. 11, a method (or process) 600 is shown. The method 600 may determine permissions for a received command The method 600 generally comprises a step (or state) 602, a step (or state) 604, a decision step (or state) 606, a step (or state) 608, a decision step (or state) 610, a step (or state) 612, a step (or state) 614, a decision step (or state) 616, a step (or state) 618, a step (or state) 620, and a step (or state) 622.

The step 602 may start the method 600. In the step 604, the processor 214 may compare the authentication factors (e.g., 354a-354b) to the stored values 364a-364n to identify and/or authenticate the visitor 50. Next, the method 600 may move to the decision step 606. In the decision step 606, the processor 214 may determine whether the visitor 50 is on the blacklist 362. If the user 50 is on the blacklist 362 then the method 600 may move to the step 608. In the step 608, the processor 214 may initiate deterrence commands. For example, the outdoor hub device 102 and/or the IP devices 120a-120n may be configured to sound an alarm, make camera shutter noises, contact the authorities, contact a central monitoring service employee, etc. Next, the method 600 may move to the step 622. In the decision step 606, if the user 50 is not on the blacklist 362, then the method 600 may move to the decision step 610.

In the decision step 610, the processor 214 may determine whether the user 50 is on the whitelist 360. For example, the authentication factors may be compared to the stored values 364a-364n and then correlated to a user on the whitelist 360. If the user 50 is not on the whitelist 360, the method 600 may move to the step 612. In the step 612, the outdoor hub device 102 may perform other analysis (e.g., determine whether the visitor is an unknown delivery person, determine whether the visitor is loitering and/or performing suspicious behavior, etc.) and/or select an audio message based on video analysis and/or analysis of audio input from the visitor 50. Next, the method 600 may move to the step 622. In the decision step 610, if the user 50 is on the whitelist 362, the method 600 may move to the step 614. In the step 614, the processor 214 may determine the permissions of the user 50. For example, each user on the whitelist 362 may have an associated set of permissions for available commands. Next, the method 600 may move to the decision step 616.

In the decision step 616, the processor 214 may determine whether the user 50 has permissions for the command provided (e.g., the command 122). If the user 50 does not have permission, the method 600 may move to the step 618. In the step 618, the processor 214 may not perform the command. Next, the method 600 may move to the step 622. In the decision step 616, if the user 50 does have permission for the command, the method 600 may move to the step 620. In the step 620, the processor 214 may initiate the command. Next, the method 600 may move to the step 622. The step 622 may end the method 600.

Figure 12:
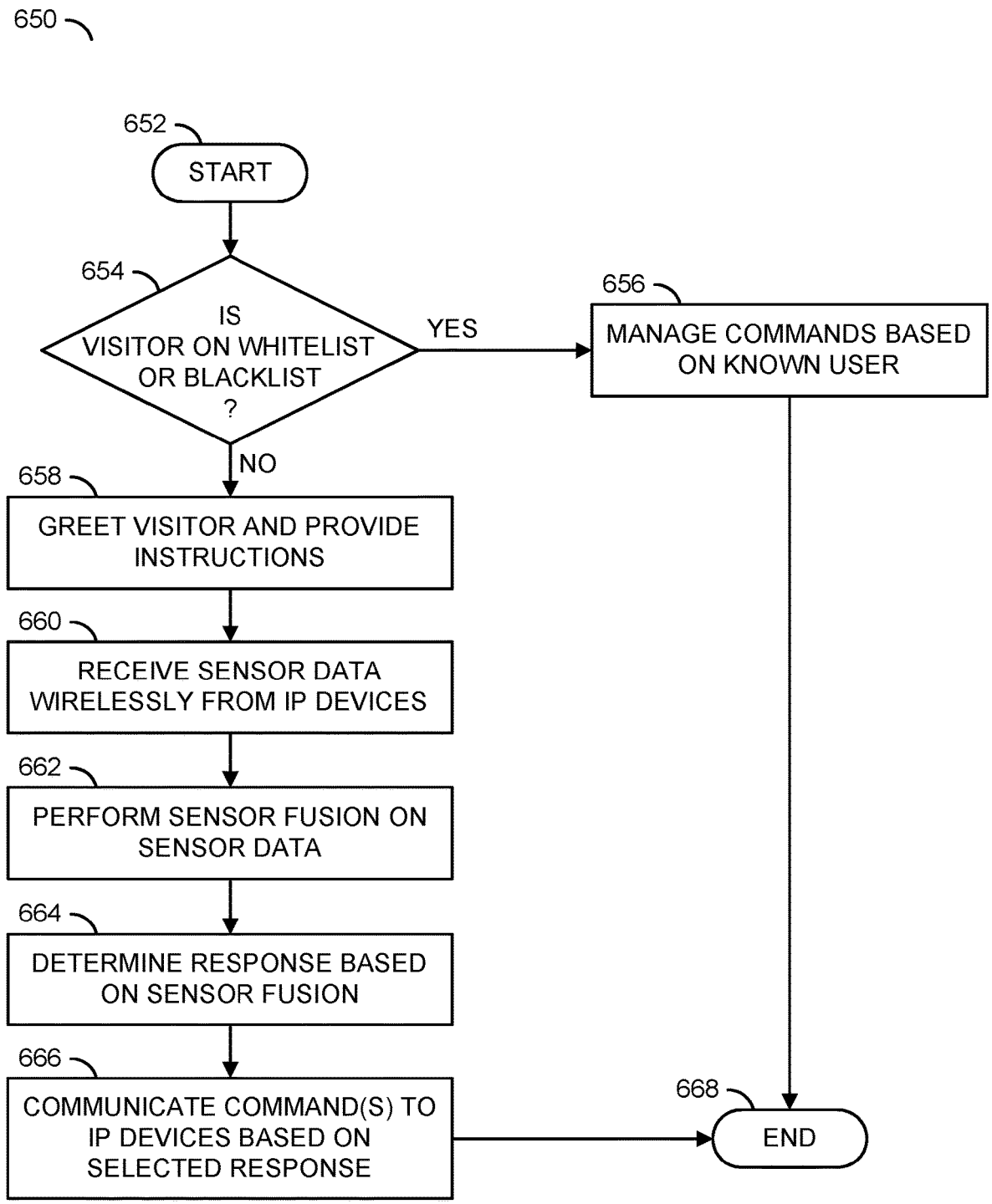
FIG. 12 is a flow diagram illustrating a method for determining responses using sensor fusion.

Referring to FIG. 12, a method (or process) 650 is shown. The method 650 may determine responses using sensor fusion. The method 650 generally comprises a step (or state) 652, a decision step (or state) 654, a step (or state) 656, a step (or state) 658, a step (or state) 660, a step (or state) 662, a step (or state) 664, a step (or state) 666, and a step (or state) 668.

The step 652 may start the method 650. Next, the method 650 may move to the decision step 654. In the decision step 654, the processor 214 may determine whether the detected visitor 50 is on the whitelist 360 or the blacklist 362. If the user 50 is on either the whitelist 360 or the blacklist 362, the method 650 may move to the step 656. In the step 656, the processor 214 may manage commands and/or responses based on the known user (e.g., greet user, allow entrance, deter user, sound alarm, etc.). Next, the method 650 may move to the step 668. In the decision step 654, if the user 50 is not on the whitelist 360 or the blacklist 362, then the method 650 may move to the step 658.

In the step 658, the outdoor hub device 102 may greet the visitor 50 and/or provide the instructions 352 (e.g., request that the visitor 50 do something for authentication). Next, in the step 660, the outdoor hub device 102 may receive sensor data from the IP devices 120a-120n and/or the processor 214 may analyze sensor data of the outdoor hub device 102. In the step 662, the processor 214 may perform sensor fusion operations on the received sensor data. For example, the sensor fusion operations may enable the processor 214 to make inferences based on multiple sources of data that may not be determined from a single source of data alone. Next, in the step 664, the processor 214 may determine the response to perform based on the sensor fusion operations. In the step 666, the wireless communication device 216 may wirelessly communicate one or more of the command signals CMD_A-CMD_N to the IP devices 120a-120n based on the selected response. The IP devices 120a-120n may perform the commands. Next, the method 650 may move to the step 668. The step 668 may end the method 650.

Figure 13:
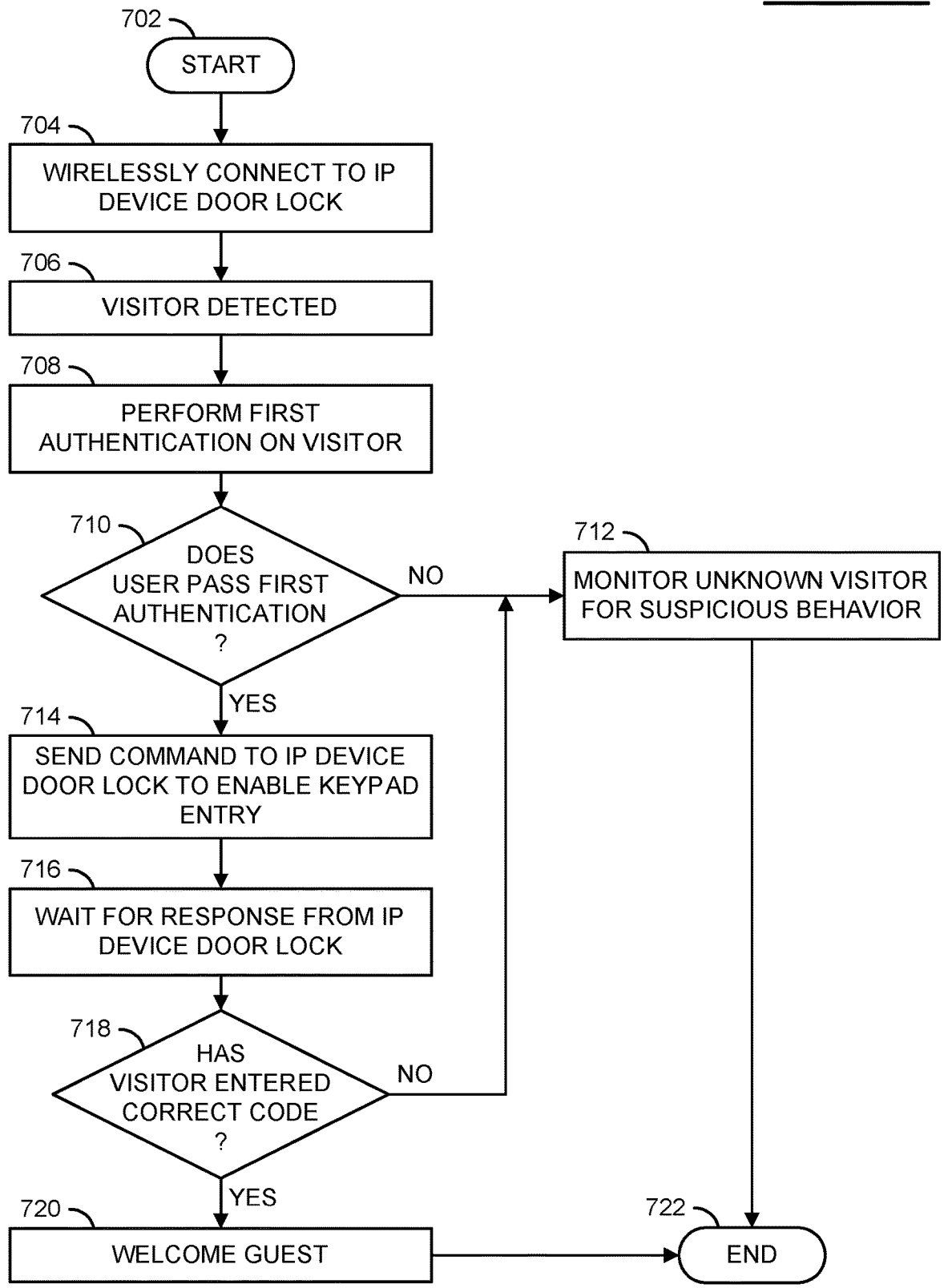
FIG. 13 is a flow diagram illustrating a method for enabling a keypad entry in response to a first authentication.

Referring to FIG. 13, a method (or process) 700 is shown. The method 700 may enable a keypad entry in response to a first authentication. The method 700 generally comprises a step (or state) 702, a step (or state) 704, a step (or state) 706, a step (or state) 708, a decision step (or state) 710, a step (or state) 712, a step (or state) 714, a step (or state) 716, a decision step (or state) 718, a step (or state) 720, and a step (or state) 722.

The step 702 may start the method 700. In the step 704, the wireless communication device 216 may wirelessly connect to one of the IP devices 120a-120n that implements smart door lock control (e.g., the IP device 120i). Next, in the step 706, the outdoor hub device 102 may detect a visitor (e.g., based on audio input, video input, information in the signals SEN_A-SEN_N, etc.). In the step 708, the processor 214 may perform a first authentication on the visitor 50. Next, the method 700 may move to the decision step 710.

In the decision step 710, the processor 214 may determine whether the user 50 passes the first authentication. If the user 50 does not pass the first authentication, the method 700 may move to the step 712. In the step 712, the outdoor hub device 102 and/or the IP devices 120a-120n may monitor the unknown visitor 50 for suspicious behavior. Next, the method 700 may move to the step 722. In the decision step 710, if the user does pass the first authentication, the method 700 may move to the step 714. In the step 714, the processor 214 may send the command signal CMD_I to the IP device door lock 120i to enable the keypad entry feature. Next, in the step 716, the outdoor hub device 102 may wait for a response (e.g., the signal SEN_I) from the IP device door lock 120i. For example, the IP device door lock 120i may be configured to receive the keypad input from the user 50 and determine if the entered code matches the stored entry code. The result may be communicated back to the outdoor hub device 102. Next, the method 700 may move to the decision step 718.

In the decision step 718, the processor 214 may analyze the signal SEN_I to determine whether the visitor 50 has entered the correct code into the IP device keypad 120i. If the user 50 has not entered the correct code, the method 700 may move to the step 712. If the user 50 has entered the correct code, the method 700 may move to the step 720. In the step 720, the outdoor hub device 102 may welcome the guest (e.g., provide a greeting, grant access, play welcoming music, etc.). Next, the method 700 may move to the step 722. The step 722 may end the method 700.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an audio output device configured to generate an audio message;
an audio input device configured to receive audio input; and
a processor configured to (i) analyze said audio input to (a) determine a first authentication factor of a user, (b) determine a second authentication factor of said user and (c) determine a command corresponding to said audio input, (ii) determine a classification of said user based on a comparison of the first authentication factor with one or more stored values, (iii) determine a confidence level of said classification of said user based on an aggregate of said first authentication factor and said second authentication factor and (iv) authenticate said user if said confidence level is above a pre-determined threshold, wherein (a) said classification corresponds to an approved list of users, (b) said confidence level is adjusted in response to said authentication factors, (c) said first authentication factor and said second authentication factor are based on said analysis of said audio input, and (d) if said user is authenticated, said processor is configured to perform said command.

2. The apparatus according to claim 1, wherein (i) said apparatus further comprises a video capture device configured to capture video frames of an area, (ii) said processor is further configured to (a) perform video analysis on said video frames to detect an object in said area and (b) determine an adjustment to said confidence level based on said object detected in said video frames and (iii) said video analysis comprises generating a third authentication factor comprising one or more passive characteristics and one or more active characteristics, said third authentication factor to aggregate with said first and second authentication factors to generate said confidence level.

3. The apparatus according to claim 2, wherein said video capture device comprises (i) a first camera configured to capture a first field of view, (ii) a second camera configured to capture a second field of view, (iii) said video frames comprise video data captured by said first camera and said second camera and (iv) together said first field of view and said second field of view are configured to provide a head to toe coverage of a person.

4. The apparatus according to claim 2, wherein if said user is not authenticated, (i) said processor is configured to select said audio message to be output by said audio output device and (ii) said selection of said audio message is based on said video analysis.

5. The apparatus according to claim 1, wherein said apparatus further comprises a plurality of sensors, each configured to capture sensor data.

6. The apparatus according to claim 5, wherein (a) said processor is configured to implement sensor fusion to make inferences about said authentication factors received from said sensor data and (b) said confidence level is further determined based on said sensor fusion.

7. The apparatus according to claim 6, wherein said sensor fusion is used to analyze said authentication factors independently.

8. The apparatus according to claim 7, wherein said confidence level is adjusted in response to said sensor fusion based on at least one of said one or more stored values representing 2D face analysis, 3D face analysis, height estimation using triangulation from multiple cameras, a smartphone MAC address, visitor gait detection, vehicle sounds, a seashell effect, said audio input or a response to a request from said audio message.

9. The apparatus according to claim 8, wherein said sensor fusion is configured to implement two-factor authentication.

10. The apparatus according to claim 1, wherein (i) said approved list comprises a whitelist comprising a plurality of groups and categories of users, (ii) a blacklist comprises a plurality of groups and categories of users and (iii) said command is performed only if said user is in said whitelist that has permission to execute said command.

11. The apparatus according to claim 1, wherein said command is configured to control a device connected wirelessly to said apparatus.

12. The apparatus according to claim 11, wherein said device comprises at least one of a door lock, a garage door opener, an irrigation system, outdoor lighting or an alarm.

13. The apparatus according to claim 11, wherein said device comprises a sensor configured to capture sensor data.

14. The apparatus according to claim 13, wherein (i) said device is configured to communicate said sensor data to said apparatus wirelessly and (ii) said sensor data is used as one of said authentication factors.

15. The apparatus according to claim 1, wherein said apparatus is configured to (i) wirelessly connect to a plurality of outdoor devices and (ii) provide an internet connection for one or more of said plurality of outdoor devices.

16. The apparatus according to claim 15, wherein said apparatus implements a wireless outdoor hub configured to provide said command to said plurality of outdoor devices if said user is authenticated.

17. The apparatus according to claim 15, wherein (i) said apparatus is configured to receive input from an app via said internet connection and (ii) determine said command from said input.

18. The apparatus according to claim 1, wherein (i) said audio input is a voice command and (ii) said processor is configured to (a) determine said command from said audio input by comparing to said one or more stored values and (b) perform said authentication based on said audio input.

19. The apparatus according to claim 18, wherein (i) said voice command further comprises a passphrase and (ii) said passphrase is one of said stored values.

20. The apparatus according to claim 1, wherein (i) one of said stored values comprises a unique identifier implemented by an object in the possession of said user and (ii) said processor is configured to adjust said confidence level above said pre-determined threshold without analyzing said audio input in response to said unique identifier.

* * * * *